(12) United States Patent
Tofano

(10) Patent No.: US 11,016,955 B2
(45) Date of Patent: May 25, 2021

(54) DEDUPLICATION INDEX ENABLING SCALABILITY

(71) Applicant: Hitachi Vantara LLC, Santa Clara, CA (US)

(72) Inventor: Jeffrey V. Tofano, San Jose, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 250 days.

(21) Appl. No.: 16/088,856

(22) PCT Filed: Apr. 15, 2016

(86) PCT No.: PCT/US2016/027667
§ 371 (c)(1),
(2) Date: Sep. 27, 2018

(87) PCT Pub. No.: WO2017/180144
PCT Pub. Date: Oct. 19, 2017

(65) Prior Publication Data
US 2020/0057752 A1    Feb. 20, 2020

(51) Int. Cl.
*G06F 7/02*    (2006.01)
*G06F 16/00*    (2019.01)
(Continued)

(52) U.S. Cl.
CPC ............ *G06F 16/215* (2019.01); *G06F 9/54* (2013.01); *G06F 16/134* (2019.01); *G06F 16/181* (2019.01); *G06F 16/22* (2019.01)

(58) Field of Classification Search
CPC .......... G06F 16/215; G06F 16/22; G06F 9/54; G06F 16/181; G06F 16/134; G06F 2212/7208
See application file for complete search history.

(56) References Cited

U.S. PATENT DOCUMENTS 7,930,559 B1 *   4/2011   Beaverson .......... G06F 11/1453
                                                      713/193
9,953,042 B1 *   4/2018   Coburn ............... G06F 16/2246
(Continued)

OTHER PUBLICATIONS

International Search Report of PCT/US2016/027667 dated Jul. 15, 2016.

*Primary Examiner* — Bruce M Moser
(74) *Attorney, Agent, or Firm* — Mattingly & Malur, PC

(57) ABSTRACT

In some examples, one or more computing devices may perform deduplication of data. For instance, a first device may receive, from a second device, a first data-portion identifier corresponding to a first deduplication data portion. The first device may include a first index portion of a deduplication index and the second device may include a second index portion of the deduplication index. Further, the first data-portion identifier may be received based on a first data-portion identifier portion being in a range of values assigned to the first index portion. The first device may locate, in the first index portion of the deduplication index, a second data-portion identifier that matches the first data-portion identifier. The first device may associate the first reference information for the first deduplication data portion with a second deduplication data portion referenced by reference information associated with the second data-portion identifier.

20 Claims, 13 Drawing Sheets

(51) Int. Cl.
  *G06F 16/215*  (2019.01)
  *G06F 16/22*   (2019.01)
  *G06F 9/54*    (2006.01)
  *G06F 16/13*   (2019.01)
  *G06F 16/18*   (2019.01)

(56) References Cited

U.S. PATENT DOCUMENTS

| | | | |
|---|---|---|---|
| 2012/0114119 A1* | 5/2012 | Ahuja | H04L 63/0853 380/44 |
| 2012/0124011 A1* | 5/2012 | Spackman | G06F 16/1756 707/692 |
| 2013/0198560 A1 | 8/2013 | Grube et al. | |
| 2014/0195749 A1 | 7/2014 | Colgrove et al. | |
| 2015/0127622 A1 | 5/2015 | Jayaraman | |
| 2015/0142756 A1* | 5/2015 | Watkins | G06F 16/152 707/692 |
| 2016/0055143 A1* | 2/2016 | Goel | G06F 21/6218 715/229 |

* cited by examiner

DEDUPLICATION INDEX ENABLING SCALABILITY

TECHNICAL FIELD

This disclosure relates to the technical field of deduplicating data, such as for storing data, replicating data, and/or moving data.

BACKGROUND

A computer system may perform deduplication of data for reducing the amount of storage capacity required for storing the data and/or for reducing the amount of the data that is transferred when replicating data from one location to another. For instance, deduplication may include dividing data into data portions and determining, for each new data portion, whether that data portion is already present in the computer system. Thus, in a deduplication system, all data portions of received data may be inspected to identify duplicate data. As the number of data portions stored in a computer system increases, determining whether a duplicate already exists for each newly received data portion becomes an ever-increasing burden that can drain the performance of the system.

Deduplication may be performed on single-node systems and on multi-node or clustered systems. In clustered computer systems, deduplication processing can cause difficulties not present in single-node systems. As one example, clustered computer systems that include deduplication processing typically handle a large amount of shared data among the nodes during and following deduplication. Thus, clustered computer systems with deduplication may perform a substantially larger number of mediated cross-node operations than clustered systems without deduplication. Further, in clustered systems, the sharing of data, such as deduplication metadata, may cause significant problems for performance scaling. For example, when deciding if a data portion is a duplicate, the communications overhead between nodes is complicated when non-local computing and storage resources need to be consulted. This overhead often works against the expected scalability gains, resulting in a larger system that does not offer gains commensurate with the cost.

SUMMARY

Some examples herein include an index able to support deduplication processing in a single-node and/or multi-node architecture. For instance, one or more computing devices may be configured to perform deduplication of data. As one example, a first computing device may receive, from a second computing device, a first data-portion identifier corresponding to a first deduplication data portion. The first computing device may include a first index portion of a deduplication index and the second computing device may include a second index portion of the deduplication index. Further, the first data-portion identifier may be received based on a first data-portion identifier portion of the first data-portion identifier being in a range of values assigned to the first index portion. The first computing device may locate, in the first index portion of the deduplication index, a second data-portion identifier that matches the first data-portion identifier. The first computing device may associate the first reference information for the first deduplication data portion with a second deduplication data portion referenced by reference information associated with the second data-portion identifier. In some cases, the deduplication may be applied across a cluster of computing devices, and the index may be distributed such that respective distributed index portions are managed by respective computing devices in the cluster. Together the distributed index portions may make up a global deduplication index for the cluster.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
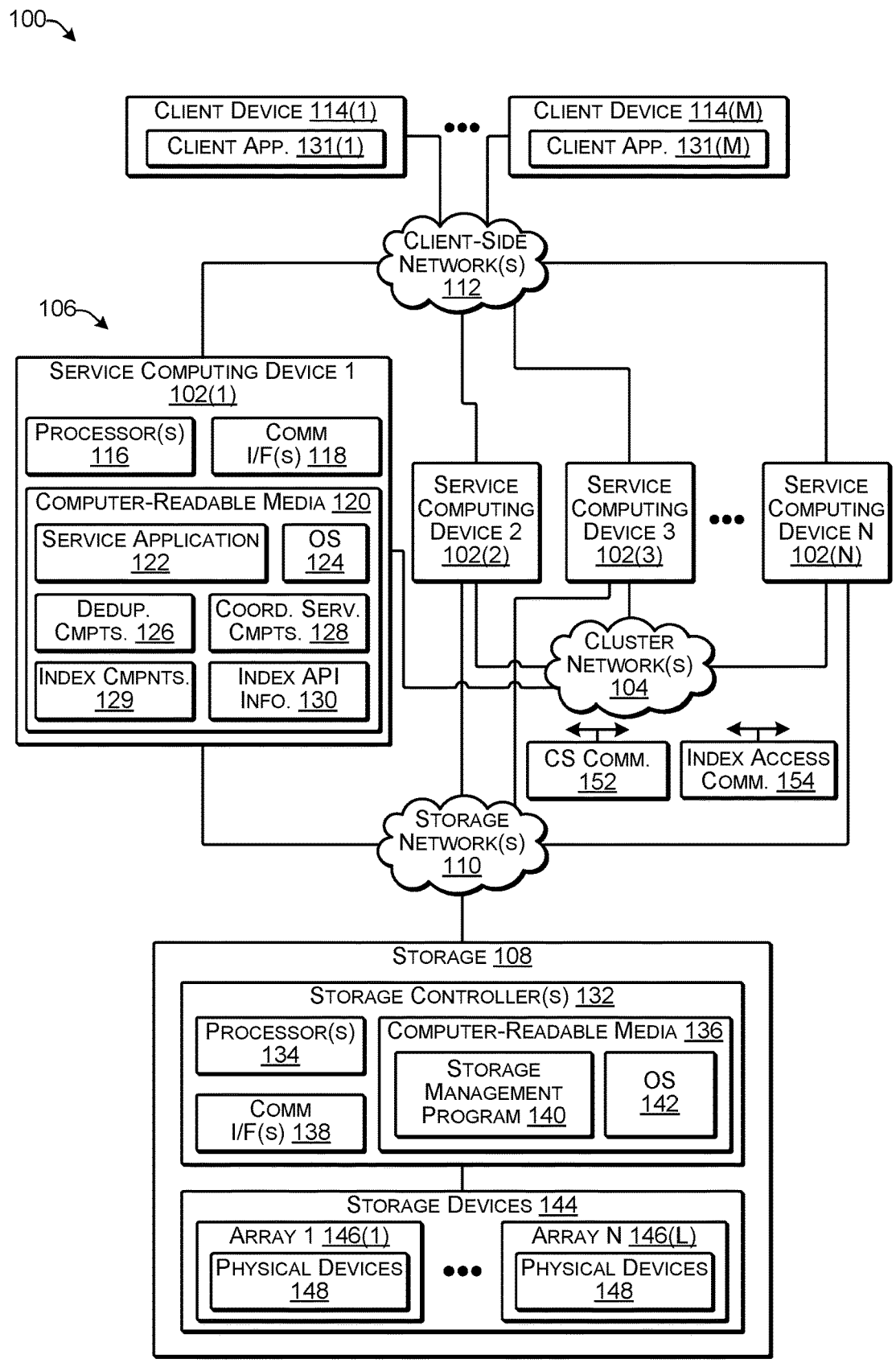
FIG. 1 illustrates an example architecture of a system including an index enabling deduplication processing according to some implementations.

Some implementations herein are directed to techniques and arrangements for a high-speed data portion classification mechanism that may employ a cluster-wide (i.e., global) distributed deduplication index. In some cases, the deduplication index may include a distributed set of structures, such as multilayered, multi-partitioned structures that enable multiple lookup paths. Together, the distributed set of structures may serve as a global deduplication index for the data of the system that is subject to deduplication. For instance, when the deduplication index is used in a cluster of computing devices, components of the index may be distributed across some or all of the computing devices in the cluster. Thus, some or all of the computing devices in the cluster may have a local deduplication index that is managed by the respective computing device, and the local deduplication indexes on the respective computing devices in the cluster may collectively comprise the overall global deduplication index for the deduplication system.

In some examples, the deduplication index may include a plurality of data-portion identifiers that are representative, at least in part, of a plurality of respective stored data portions. The deduplication index may be accessed during deduplication processing for quickly identifying duplicate data portions. In some cases, the index may be configured to enable several deduplication-specific techniques that allow the index to be used with sufficient speeds and to scale for serving multi-GB/sec ingestion when operating on data stores, e.g., in excess of a petabyte. Furthermore, implementations herein may include a multi-layered, partitioned, and/or temporal smart indexing approach suitable for both single-node and clustered deduplication computer systems. Additionally, the deduplication index herein may function in both memory-rich and memory-poor environments while still achieving good performance and being able to scale for massive capacity computer systems.

Implementations herein include transparent index segmentation and layering to reduce search sizes, increase parallelism and leverage deduplication properties to avoid costly brute force searches. Additionally, several interlocked techniques for reducing memory footprint may be applied, including use of smart mode algorithms for intelligent sparse mode operation.

In some examples, the index herein may be employed in a single-node environment, a cluster of one node, and/or a cluster of multiple nodes. Further, the deduplication index may be a global index and may be used for both inline deduplication processing and post-process deduplication processing. As one example, the index may enable scaling of performance to tens of petabytes, or more, and may enable inline ingest speeds in the range of multiple gigabytes per second per node. The deduplication index may be used in limited memory environments, and may be able to leverage a large amount of memory when available. For example, the deduplication index may be used in shared-nothing environments and/or in a virtual machine environment.

The deduplication index herein may include a complex, segmented, multi-layered set of structures that support classification of deduplication data portions, data replication, and deduplication statistics gathering. In addition, the deduplication index may be a write-side only structure that is not used during read-side operations. Additionally, the deduplication index may be able to run in a variety of performance modes, which may vary from a default mode, to a sparse mode, to a smart mode. Each of these modes may differ in the manner in which keys are selected and stored in a lookup structure used for searching the index, such as for enabling a sparse structure that may be searched quickly.

In addition, the deduplication index may run in limited memory footprints, and may enable replacement of aged entries with new entries when one or more thresholds are met. This allows the index footprint to be static, even as stored data sets increase. Alternatively, the deduplication index may be set in a mode that allows the index to grow freely such that index items are continuously added to the index, and storage space for the index is increased as needed. Additionally, the index may be structured to support very high-speed classifications of deduplication data portions, such as for enabling inline classifications across a petabyte of preexisting data.

To achieve the index described above, several techniques are employed herein, each contributing to one or more of the index features discussed above. For example, the index may be sharded across a plurality of computing devices. For single node implementations, only one shard may exist. For multi-node computing environments, the multiple shards may be distributed across all or some of the nodes based on one or more configuration rules. In addition, the index may be sliced n-ways on each computing device. Thus, each shard may be sliced into one or more slices. Further, the index may be striped across storage units. This may be accomplished internally by the index module, i.e., without external volume management support. Further, the stripe organization may also serve as a second-level hash lookup. Additionally, the stripes may function as a "clustering" mechanism by storing similar or related items together in a physical area of storage. This allows quick access, look ahead, and clustered "localized scans" for lookups. Accordingly, the deduplication index may be segmented into three parts on real or virtual clusters: namely shards, slices, and stripes. An index API (application programming interface) may be used for routing shard-level requests to the proper service computing device. After the request is received by the correct service computing device, information from the data-portion identifiers, as well as other available context information may be used to determine further the proper slice and stripe. As one example, a first portion of a data-portion identifier may be used for routing on the shard level, a second portion of the data-portion identifier may be used for routing on a slice level, and a third portion of the data-portion identifier may be used for routing on the stripe level. This three level segmented model, along with the routing algorithms, provides a global view of the index. Further, the segmenting of the deduplication index is internal and reduces the cost of searches for very large databases.

As mentioned above, in some examples, the global deduplication index may be distributed across a plurality of computing devices in a cluster as a plurality of index components that are local to the respective computing devices to which they are assigned and are managed thereby as local deduplication indexes. Each local deduplication index may include a shard of the global deduplication index. Each shard may include at least one temporal index log that stores index items as the index items are added to that portion of the index log, such as in the order in which the index items are received or otherwise routed to the shard. In some examples, there may be a respective index log corresponding to each slice of each shard. For each index log, the local deduplication index may also include a lookup structure that includes relatively short surrogate lookup keys that are derived from or otherwise based on the data-portion identifiers in the index log. The lookup structure may include, for each surrogate key, a pointer to a location in the index log of the corresponding data-portion identifier. As discussed additionally below, the lookup structure may be searched more quickly than the log itself. Thus, the index log may support a first classification layer and the lookup structure may support an alternate classification layer, thereby enabling two alternative lookup paths that may be used for attempting to locate matching data-portion identifiers.

The index API may be used to route requests across the shards, slices, and stripes, essentially assembling the distributed index components into a single coherent global deduplication index. As discussed above, each local deduplication index on a service computing device, i.e., all slices and stripes, may be further organized into at least two classification layers. These two classification layers are built on the index log and the lookup structures, respectively. In some examples, an additional classification layer may be provided, for a total of three classification layers, each of which may enable an alternative lookup path. The additional classification layer may be referred to as the external temporal lookup layer. The external temporal lookup layer may be referred to as being "external" because it is external to the deduplication index. In some examples, the external temporal lookup layer may include an external block cache scan list maintained by the respective computing devices and which may be maintained logically independent of the deduplication index. The external temporal lookup layer does not rely on a data-portion identifier as a key; rather a search on the external temporal lookup layer may be performed instead of accessing the index, and may be based on other criteria, such as at least one of stored location of data or temporal arrival of data. Thus, the external temporal lookup layer may provide an alternate lookup path that does not include a comparison of data-portion identifier values or searching the global deduplication index.

In some cases, index entries that are placed in the deduplication index lookup structures (all index entries are entered into the temporal index log), may be selected based on a selected mode (which may also be referred to herein as "smart" modes). These modes may execute one of several algorithms to select entries worth placing in the lookup structures. Further, the index structures may be fully recoverable. For example, index structures may be lost, corrupted, or dropped, and may be subsequently fully rebuilt from data stored by the persistent services. Additionally, internal methods to speed lookups, including negative lookups, are included at the stripe level.

The index structures herein are laid out to be extremely memory efficient, which allows billions of keys to be stored in memory. For instance, both the temporal index log and the lookup structures may be designed as paging structures. These structures may be configured so that the entire index exists in memory, or so that only certain portions of the overall index are stored in memory, as needed. Accordingly, the deduplication index herein enables high-end performance with minimum memory footprint, allowing the deduplication index to cover a very large storage space and enabling scaling of capacity in both single-node and multi-node environments.

For discussion purposes, some example implementations are described in the environment of a cluster of computing devices in communication with one or more storages and one or more client devices. However, implementations herein are not limited to the particular examples provided, and may be extended to other types of computing systems, other types of storage environments, other system architectures, and so forth, as will be apparent to those of skill in the art in light of the disclosure herein.

FIG. 1 illustrates an example architecture of a system 100 configured to include deduplication capabilities according to some implementations. The system 100 includes a plurality of service computing devices 102(1), 102(2), 102(3), . . . , 102(N), also referred to herein as nodes, that are able to communicate with each other, such as through a cluster network 104. As one example, the service computing devices 102 may be arranged as a cluster 106 of computing devices. In the examples herein, a cluster may include a group of service computing devices (i.e., nodes) and a storage 108 that together act as one computing system with respect to customer or other client applications. The service computing devices 102 in the cluster 106 may each provide processing power and storage access, and may typically be connected to each other through a private network, high-speed interconnects, and/or other suitable high-speed networking technology, referred to herein as the cluster network 104. As one example, the cluster 106 herein may differ from other system topologies (such as grids of separate nodes able to access private or shared storage back-ends) in that all the client-accessible data stored by the cluster 106 may be available through each of the service computing devices 102 in the cluster 106.

Each service computing device 102 that is part of the cluster 106 may coordinate its own activities with other service computing devices 102 that are members of the cluster 106 to avoid data corruption, such as may be caused by simultaneous or unauthorized changes to the data. As discussed additionally below, in some examples herein, a coordination service, such as a distributed lock manager (DLM) or other resource-access-coordination mechanism may provide mediation of activities of the service computing devices 102 for coordinating access to shared resources to ensure data integrity. Further, any service computing device 102 that participates in data accesses, related protocol processing, and/or deduplication processing may be referred to as a processing node of the cluster 106. Thus, the cluster 106 may include one or more service computing devices 102 as processing nodes, and when more than one service computing device 102 is included, the cluster 106 may be referred to as a multi-node cluster. For example, a single-node cluster may differ from a stand-alone node in that the single-node cluster is configured to be clusterable with other nodes for creating a multi-node cluster. Further, in some examples, the index and deduplication processing herein may be applied in a stand-alone node and/or a single-node cluster. Accordingly, implementations herein are not limited to application in a multi-node cluster.

The system 100 may include deduplication capability and may provide a single global (i.e., cluster-wide) deduplication domain. Like traditional non-deduplication systems, the clustered multi-node deduplication system herein employs careful coordination of the activities of each service computing device 102 when accessing data and metadata. Failure to coordinate properly the data access of the multiple service computing devices 102 may result in more than one service computing device 102 concurrently updating data and/or metadata in conflict with each other. Consequently, any access to shared resources in the cluster 106 may be mediated, such as by a coordination service. For example, the coordination service may provide a cluster-wide ordering of all data accesses and metadata accesses to ensure data integrity and provide clients with expected system interactions.

The clustered deduplication system 100 herein allows external access through various front-end protocols that run on the service computing devices 102. The form of access may be through NAS protocols, block protocols, and/or proprietary protocols. All data ingested by one service computing device 102 in the cluster 106 can be accessed by the other service computing devices 102 in the cluster 106. Thus, there may be no requirement to pin files, objects, or data set access to specific service computing devices 102. Similarly, all data that is stored in the cluster storage 108 may be accessed through any of the service computing devices 102 in the cluster 106, regardless of physical storage topology.

Furthermore, the service computing devices 102 in the cluster 106 may operate in true "peer-mode" or with specialized mode. Regardless of mode, the service computing devices 102 may each map into the overall single system image (SSI) presented by the deduplication system. In some examples, one or more service computing devices 102 may serve as central coordinators, with other service computing devices 102 functioning as "peer" processing nodes and/or replication pumps. In other examples, select service computing devices 102 may function as one of data ingest nodes, deduplication nodes, or replication nodes. The function of each service computing device 102 may be somewhat irrelevant as long as each service computing device 102 integrates into the overall SSI and coordinates with the other service computing devices 102 to deliver an external storage abstraction.

As illustrated in FIG. 1, the service computing devices 102 may be in communication with, or otherwise coupled to the storage 108, such as through one or more storage networks 110. Further, the service computing devices 102 may be able to communicate over one or more client-side networks 112 with one or more client devices 114, such as user devices or other devices that may access the service computing devices 102. Thus, the cluster 106 may store and manage data for the client devices 114 and may appear to the client devices 114 as a unified SSI storage service.

In some examples, the service computing devices 102 may include a plurality of physical servers or other types of computing devices that may be embodied in any number of ways. For instance, in the case of a server, the modules, programs, other functional components, and a portion of data storage may be implemented on the servers, such as in a cluster of servers, e.g., at a server farm or data center, a cloud-hosted computing service, and so forth, although other computer architectures may additionally or alternatively be used. In the illustrated example, each service computing device 102 includes, or may have associated therewith, one or more processors 116, one or more communication interfaces 118, and one or more computer-readable media 120. Further, while a description of one service computing device 102 is provided, the other service computing devices 102 may have the same or similar hardware and software configurations and components.

Each processor 116 may be a single processing unit or a number of processing units, and may include single or multiple computing units or multiple processing cores. The processor(s) 116 can be implemented as one or more central processing units, microprocessors, microcomputers, microcontrollers, digital signal processors, state machines, logic circuitries, and/or any devices that manipulate signals based on operational instructions. For instance, the processor(s) 116 may be one or more hardware processors and/or logic circuits of any suitable type specifically programmed or configured to execute the algorithms and processes described herein. The processor(s) 116 can be configured to fetch and execute computer-readable instructions stored in the computer-readable media 120, which can program the processor(s) 116 to perform the functions described herein.

The computer-readable media 120 may include volatile and nonvolatile memory and/or removable and non-removable media implemented in any type of technology for storage of information such as computer-readable instructions, data structures, program modules, or other data. For example, the computer-readable media 120 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 120 may be a tangible non-transitory medium to the extent that, when mentioned, non-transitory computer-readable media exclude media such as energy, carrier signals, electromagnetic waves, and/or signals per se. In some cases, the computer-readable media 120 may be at the same location as the service computing device 102, while in other examples, the computer-readable media 120 may be separate or partially remote from the service computing device 102.

The computer-readable media 120 may be used to store any number of functional components that are executable by the processor(s) 116. In many implementations, these functional components comprise instructions, modules, or programs that are executable by the processor(s) 116 and that, when executed, specifically program the processor(s) 116 to perform the actions attributed herein to the service computing device 102. Functional components stored in the computer-readable media 120 may include a service application 122, an operating system (OS) 124, and deduplication components 126, each of which may include one or more computer programs, applications, executable code, computer-readable instructions, or portions thereof. For example, the deduplication components 126 may be a module of the OS 124, a module of the service application 122, or may run independently on top of the OS 124. Furthermore, the service application 122 may be executed by the processors(s) 116 for performing various data processing tasks, such as for interacting with the client devices 114, storing data for the client devices in the storage 108, and/or for providing the client devices 114 with access to the data stored in the storage 108. For instance, the service application 122 may configure individual service computing devices 102 to provide one or more services that may include namespace management, process management, extent allocation management, lock management, replication/data movement session management, and load balancing. Additionally, the OS 124 may control and manage various functions of the service computing device 102.

In some examples, the deduplication components 126 may include a deduplication software stack layered on storage services and/or OS services. The deduplication software stack may be configured to run the same whether on raw hardware with a basic OS or in a virtualized environment. As discussed below with respect to FIG. 3, the deduplication software stack may include a deduplication parser, a classifier, and a persistence engine, as well as metadata handling services and coordination services. Further, the deduplication components 126 may employ an index API enabled by index API information 127 provided to each service computing device 102 for communicating with other service computing devices 102 for accessing and/or adding to the index.

Additionally, the functional components may include coordination services components 128. One example of a coordination service is a DLM, although implementations herein are not limited to a DLM. Further, the index components 130 herein may operate independently of the coordination services. For example, while parts of the deduplication stack, such as the persistence engine, may employ the coordination services, the deduplication index does not require coordination services to operate. Examples of executable coordination services components 128 may include a coordination service server program and coordination service library routines (not shown in FIG. 1). For instance, a coordination service library may correspond to a coordination service API used for communication between the coordination service server program and clients of the coordination service. In some cases, the functional components may be stored in a storage portion of the computer-readable media 120, loaded into a local memory portion of the computer-readable media 120, and executed by the one or more processors 116. Numerous other software and/or hardware configurations will be apparent to those of skill in the art having the benefit of the disclosure herein.

In addition, the computer-readable media 120 may store data and data structures used for performing the functions and services described herein. For example, the computer-readable media 120 may store data, metadata, data structures, and/or other information (not shown in FIG. 1) used by the deduplication components 126, the service application 122, the coordination services components 128, and/or the OS 124. For instance, some or all of the service computing devices 102 may maintain the index API information 127 and index components 130. In some examples, the global deduplication index may be divided into multiple index shards, and the index shards may be distributed as index components 130 across some or all of the service computing devices 102 based on one or more configuration rules. In addition, each shard may be sliced into one or more slices, and further, the index components 130 may be striped across storage units in the storage 108. Additional details of the configuration of the index and index components 130 are discussed below.

Each service computing device 102 may also include or maintain other functional components and data, which may include programs, drivers, etc., and other data used or generated by the functional components. Further, the service computing device 102 may include many other logical, programmatic, and physical components, of which those described above are merely examples that are related to the discussion herein.

The communication interface(s) 118 may include one or more interfaces and hardware components for enabling communication with various other devices, such as over the network(s) 104, 110, and 112. Thus, the communication interfaces 118 may include, or may couple to, one or more ports that provide connection to the cluster network(s) 104 for communication with other service computing devices 102 in the cluster 106; connection to the storage network(s) 110 for communicating with the storage 108; and connection to the client-side network(s) 112 for communication with the client devices 114. For example, the communication interface(s) 118 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The cluster network(s) 104, storage network(s) 110, and client-side network(s) 112 may include any suitable communication technology, including a wide area network, such as the Internet; a local area network, such as an intranet; a wireless network, such as a cellular network, a local wireless network, such as Wi-Fi, and/or a short-range wireless communications, such as BLUETOOTH®; a wired network including Fibre Channel, fiber optics, Ethernet, or any other such network, a direct wired connection, or any combination thereof.

As an example, the cluster network(s) 104 may include an Internet Protocol (IP) switch and high-speed interconnects, a LAN, or the like, for fast, private intracluster communications. The cluster network(s) 104 may include any high speed network technology such as an INFINIBAND®, Fibre Channel, Ethernet, or other traditional or remote directory memory access (RDMA) based networks. The cluster network(s) 104 may provide a communication channel between the service computing devices 102 that is unencumbered by potential storage support network traffic, allowing for more efficient communication between the nodes. Additionally, the storage network(s) 110 may employ Fibre Channel technology or other suitable storage networking technology. In addition, the client-side network(s) 112 may include the Internet. However, implementations herein are not limited to any particular networking technologies.

Thus, the networks 104, 110, and 112 may include wired and/or wireless communication technologies. In addition, the client-side network(s) 112, or the other networks herein, may include a storage support network that enables external administrative access to each of the service computing devices 102 via a management computer system, such as may be implemented using one of the client devices 114 or other suitable computing device.

Components used for the networks 104, 110 and 112 can depend at least in part upon the type of network, the environment selected, desired performance, and the like. For instance, one or more of the networks 104, 110, and/or 112 may include forwarding devices, such as switches or sets of switches. As one example, these switches may be Ethernet switches capable of 1 Gb/s, 10 Gb/s, 40 Gb/s, 100 Gb/s, or greater data rates, or any other suitable type of switches. The protocols for communicating over the networks herein are well known and will not be discussed in detail. Accordingly, the service computing devices 102 are able to communicate with each other over the cluster network(s) 104, communicate with the storage 108 over the storage network(s) 110, and communicate with the client devices 114 over the client-side network(s) 112 using wired and/or wireless connections, and combinations thereof. Further, in some examples, some or all of the networks 104, 110, 112 may be the same network.

Each client device 114 may be any suitable type of computing device such as a desktop, workstation, server, laptop, tablet computing device, mobile device, smart phone, wearable computing device, or any other type of computing device able to send data over a network. For instance, the client devices 114 may generate data that is sent to the cluster 106 for data storage, backup storage, long term remote storage, or any other sort of data storage. In some cases, the client device 114 may include hardware configurations similar to that described for the service computing device 102, but with different data and functional components to enable the client devices to perform the various functions discussed herein. In some cases, a user may be associated with a respective client device 114, such as through a user account, user login credentials, or the like. Each client device 114(1)-114(M) may access one or more of the service computing devices 102 through a respective instance of a client application 131(1)-131(M), such as a browser or other application executed on the client device 114. For instance, the client application 131 may provide a graphic user interface (GUI), a command line interface, and/or may employ an application programming interface (API) for communicating with the service application 122 on a service computing device 102. Furthermore, while one example of a client-server configuration is described herein, numerous other possible variations and applications for the computing system 100 herein will be apparent to those of skill in the art having the benefit of the disclosure herein.

The storage 108 may provide storage capacity for the cluster 106 for storage of data, such as file data or other object data, and which may include data content and metadata about the content. The storage 108 may include storage arrays such as network attached storage (NAS) systems, storage area network (SAN) systems, or storage virtualization systems. Further, the storage 108 may be co-located with one or more of the service computing devices 102, or may be remotely located or otherwise external to the service computing devices 102. Accordingly, the deduplication index herein is described as a component of a deduplication system, and as such, it may be embedded in NAS and SAN devices as well as being part of a software stack. Further, the deduplication index, as a subcomponent may be used in lower level software (such as on arrays) and therefore may be used outside of deduplication environments.

In the illustrated example, the storage 108 includes one or more storage computing devices referred to as storage controller(s) 132, which may include one or more servers or any other suitable computing devices, such as any of the examples discussed above with respect to the service computing device 102. The storage controller(s) 132 may each include one or more processors 134, one or more computer-readable media 136, and one or more communication interfaces 138. For example, the processor(s) 134 may correspond to any of the examples discussed above with respect to the processors 116, the computer-readable media 136 may correspond to any of the examples discussed above with respect to the computer-readable media 120, and the communication interfaces 138 may correspond to any of the examples discussed above with respect to the communication interfaces 118.

Further, the computer-readable media 136 of the storage controller 132 may be used to store any number of functional components that are executable by the processor(s) 136. In many implementations, these functional components comprise instructions, modules, or programs that are executable by the processor(s) 134 and that, when executed, specifically program the processor(s) 134 to perform the actions attributed herein to the storage controller 132. Functional components stored in the computer-readable media 136 may include a storage management program 140 and an OS 142, each of which may include one or more computer programs, applications, executable code, computer-readable instructions, or portions thereof. For example, the storage management program 140 may control or otherwise manage the storage of the data in a plurality of storage devices 144 coupled to the storage controller 132. The OS 142 may control and manage various functions of the storage controller 132.

In addition, the storage devices 144 may, in some cases, include one or more arrays 146(1)-146(L) of physical storage devices 148. For instance, the storage controller 132 may control one or more arrays 146, such as for configuring the arrays in a RAID (redundant array of independent disks) configuration or other desired storage configuration. The storage controller 132 may present logical units based on the physical devices to the service computing devices 102, and may manage the data stored on the underlying physical devices 148. The physical devices 148 may be any type of storage device, such as hard disk drives, solid state devices, optical devices, magnetic tape, and so forth, or combinations thereof. In some examples, the storage 108 may include thin-provisioning capability configured to provide on-demand storage capacity, may include failover protection, automated replication, backup, archiving, or the like. Alternatively, in other examples, one or more of the service computing devices 102 may act as the storage controller, and the storage controller 132 may be eliminated.

In the illustrated example, the cluster 106 and storage 108 are configured to act as a data storage system 150 for the client devices 114. The service application 122 on each service computing device 102 may be executed to receive and store data from the client devices 114 and/or subsequently retrieve and provide the data to the client devices 114. The data storage system 150 may be scalable to increase or decrease the number of service computing devices 102 in the cluster 106, as desired for providing a particular operational environment. For example, the performance of the storage system 150 may scale in substantially a linear fashion as service computing devices 102 are added to the cluster 106. The amount of storage capacity included within the storage 108 can also be scaled as desired. In some implementations, the storage 108 may be scaled to multiple petabytes or more of data storage space.

Further, the service computing devices 102 and the client devices 114 may include any number of distinct computer systems, and implementations disclosed herein are not limited to a particular number of computer systems or a particular hardware configuration. In addition, for increased fault tolerance, the communication interfaces 118 of each of the service computing devices 102 may include redundant network connections to each of the networks to which the service computing devices are coupled. Further, the multi-node architecture of the data storage system 150 may provide for fault tolerance and node fail over. For example, should any one of service computing devices 102 fail, one or more of the other service computing devices 102 may be configured to detect the failure and automatically perform one or more processes previously executed by the failed service computing device 102 until a suitable replacement is deployed and operational. In addition, at least some of the components disclosed herein may continue to function uninterrupted despite the failure of other ones of the service computing devices 102.

In some examples, each of the service computing devices 102 includes the service application 122, the deduplication components 126 and the coordination services components 128, and/or other executable code and data structures, configured to cause the data storage system 150 to perform data deduplication, data storage, data access, and/or data replication. To perform these functions without allowing data corruption, the service computing devices 102 may exchange coordination services (CS) communications 152 through the cluster network(s) 104.

The data storage system 150 may be configured to perform deduplication of data, such as for any data received from a client device 114. Further, the data storage system 150 may be configured to perform deduplication of data that is replicated or otherwise transferred to another storage system, storage location, or the like. As mentioned above, the deduplication components 126 may be executed to perform deduplication and, during the deduplication, may access a global deduplication index maintained by the storage system 150. The deduplication index may be divided among multiple ones of the service computing devices as the index components 129, and together the index components 129 may make up the deduplication index.

During deduplication, a stream of ingested deduplication data portions may be classified data portion by data portion. This classification may involve a comparison of each ingested data portion to all other data portions stored to classify the ingested data portion as a duplicate or unique. During the comparison, index access communications 154 are performed to access the index to determine whether a matching data portion has already been indexed and stored in the storage system 150. If a matching data portion is already stored, the ingested data portion is not stored, and instead, referential metadata is created for the ingested data portion, pointing to the existing matching data portion.

Index access communications 154 are also performed to access the deduplication index during replication. For example, when deduplication-enabled replication is performed, a negotiation protocol between the replication source and target may include access to the index to determine whether the data already exists at the target location before sending the data.

Performance of the deduplication index in both these cases may affect the performance of the overall system. Consequently, the index herein is designed to enable deduplication performance and to further enable scaling of the storage system without sacrificing performance Performance of the deduplication index may include the latency of individual index operations and the overall throughput of the index operations. Further scaling may include the ability to run the index at a constant performance level as system capacity grows. For instance, as more data is stored, the index typically may become larger and consequently searches of the index may take a longer amount of time. In addition, in cluster systems, substantial software overhead and internode communications may be employed to coordinate multi-node operations. For systems with vast amounts of shared data, there is an inherent contention for access to data, which can significantly affect performance. Accordingly, the structure of the index herein may reduce contention between nodes in the data storage system 150.

The data storage system 150 is not limited to the particular configuration illustrated in FIG. 1. This configuration is included for the purposes of illustration only. Various examples herein utilize a variety of hardware components, software components, and combinations of hardware and software components that are configured to perform the processes and functions described herein. In addition, in some examples, the hardware components described above may be virtualized. For example, some or all of the service computing devices 102(1)-102(N) may be virtual machines operating on the one or more hardware processors 116 or portions thereof. As one example, the service computing device 102(1), service computing device 102(2), and the service computing device 102(3) may be virtual machines operating on a first set of processors 116, and the service computing device 102(N) and/or other service computing devices may be separate physical computing devices, or may be configured as virtual machines on separate physical computing devices, or on the same physical computing device. In the case that virtual machines are employed, the cluster network(s) 104 may include an internal bus of the physical computing device on which the virtual machines are implemented. Numerous other hardware and software configurations will be apparent to those of skill in the art having the benefit of the disclosure herein. Thus, the scope of the examples disclosed herein is not limited to a particular set of hardware, software, or a combination thereof.

Figure 2:
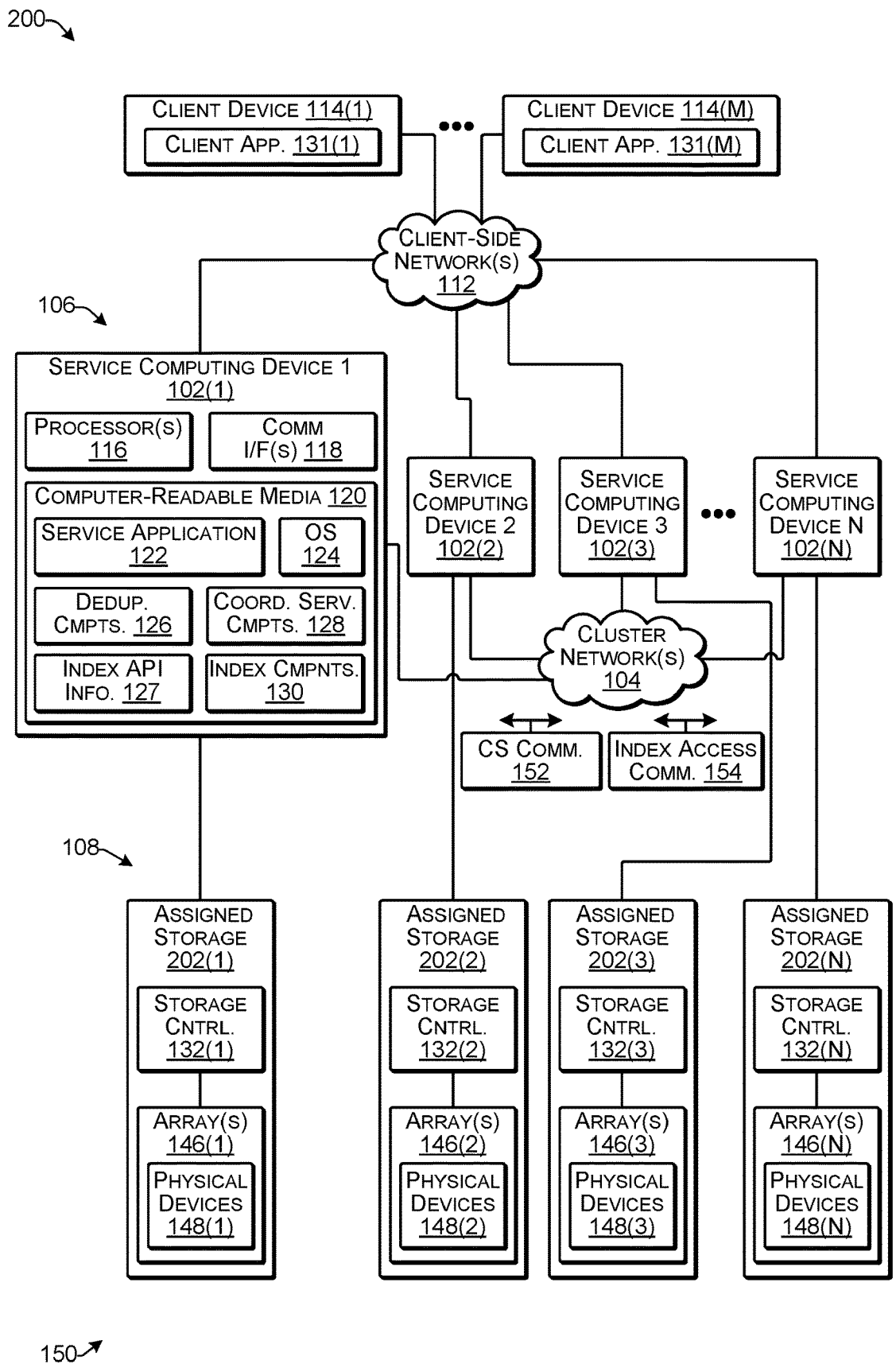
FIG. 2 illustrates an example architecture of a system including an index enabling deduplication processing according to some implementations.

FIG. 2 illustrates an example architecture of a system 200 configured for enabling deduplication processing according to some implementations. The system 200 includes the plurality of service computing devices 102(1), 102(2), 102(3), . . . , 102(N) that may be arranged as the cluster 106, as discussed above, for providing an alternative configuration of the data storage system 150. In the example of FIG. 2, each of the service computing devices 102(1), 102(2), 102(3), . . . , 102(N) may have its own assigned storage 202(1), 202(2), 202(3), . . . , 202(N), respectively. For example, the service computing devices 102 may each be connected to a respective assigned storage 202 through a respective direct connection using a suitable protocol, such as Fibre Channel, ISCSI, SATA, or through any of the networking technologies discussed above. Thus, the assigned storage 202 of each service computing device 102 may be private in that the each service computing device 102 is restricted from directly accessing the assigned storages 202 of the other service computing devices 102.

Together, the assigned storages 202(1), 202(2), 202(3), . . . , 202(N) may serve as the storage 108 for the storage system 150, as in the example discussed above with respect to FIG. 1, with the difference being that a service computing device 102 that wants to access an assigned storage 202 of another service computing device 102, communicates with the other service computing device 102, rather than directly with the storage 202. Accordingly, in the following discussion, no distinction is drawn between assigned storage and common storage, and the storage is merely referred to as the storage 108 unless specifically stated otherwise.

In the illustrated example, each assigned storage 202(1), 202(2), 202(3), . . . , 202(N) may include a respective storage controller 132(1), 132(2), 132(3), . . . , 132(N), and one or more arrays 146(1), 146(2), 146(3), . . . , 146(N), each including one or more physical devices 148(1), 148(2), 148(3), . . . , 148(N). Alternatively, in some examples, the service computing device 102 may act as the storage controller for its own assigned storage 202, and the storage controller 132 might not be included. Additionally, in some examples, rather than having an array 146 of physical devices, other configurations of one or more physical storage devices 148 may be employed. Further, while two possible example system configurations have been illustrated and described herein, numerous other possible configurations will be apparent to those of skill in the art having the benefit of the disclosure herein.

Figure 3:
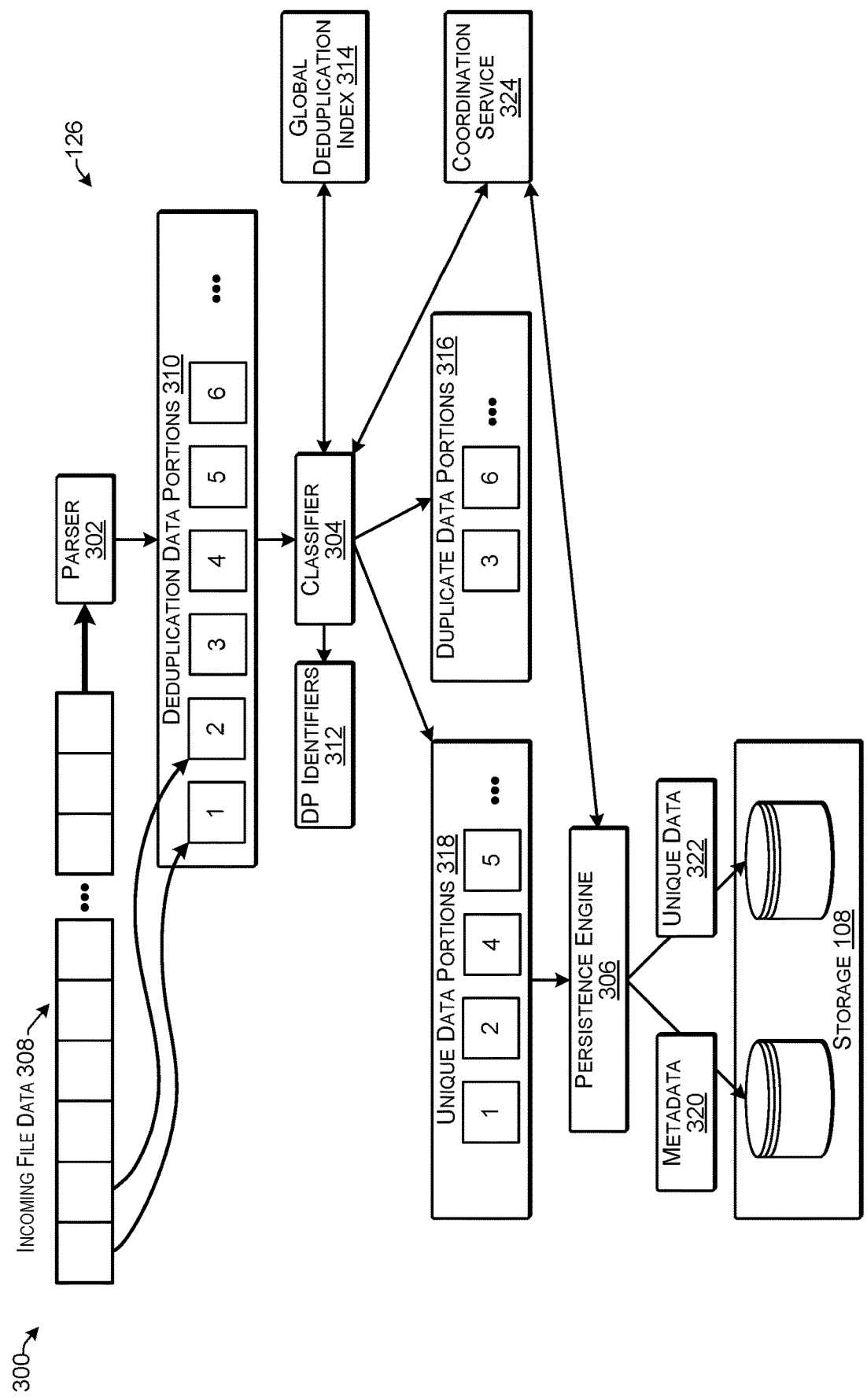
FIG. 3 illustrates an example of deduplication processing that may be performed by the storage system using the index arrangement according to some implementations.

FIG. 3 illustrates an example of deduplication processing 300 that may be performed by the storage system 150 using the index arrangement according to some implementations. The deduplication processing may be performed by the deduplication components 126 discussed above with respect to FIG. 1. The deduplication processing may be used to reduce the amount of data stored in the storage system 150, thereby effectively increasing the useful capacity of the storage system. In addition, the deduplication processing may reduce the amount of data that is transferred during data replication operations, such as when replicating data from a first storage location to a second storage location.

Each node in the cluster may execute the deduplication components 126, which may integrate with external access protocols. The deduplication components 126 may be responsible for deduplication processing on ingest, and for assembling relevant blocks of information for outgress or replication. In some examples, the deduplication components 126 may be a software stack layered on storage services and/or OS services. Additionally, or alternatively, the deduplication stack may be able to run on raw hardware, e.g., with a basic OS or in virtualized environments. Further, in some implementations, the deduplication components 126 may include, or may interact with, several functional components, including: a deduplication parser; a classification engine (which may generate data-portion identifiers and access and maintain the deduplication index); a persistence engine; metadata handling services; and coordination services. Each of these components is discussed additionally below.

Adding deduplication processing to a cluster tends to increase the amount of data and metadata sharing. For example, the smaller the deduplication data portion, the more likely that deduplication data portions will match other deduplication data portions, which can result in greater deduplication of the data. Accordingly, deduplication implementations push to handle smaller data portion sizes, which is at odds with reducing internode communications overhead. For example, if the system uses larger data portion sizes, there are fewer resources to handle, and therefore less internode communication overhead. Smaller data portions for deduplication also mean that more entries are stored in the deduplication index and more referential metadata is generated.

To compensate, many deduplication implementations tend to map multiple deduplication data portions into physical storage blocks. However, if the same storage block is needed by two nodes concurrently, cross-node sharing is increased, which can affect system performance Deduplication processing can also introduce many small updates into the cluster workload. For example, suppose that a first service computing device realizes it has a duplicate data portion. To write the reference, the first service computing device updates corresponding referential data that keeps track of all the places the data portion is shared. This typically results in a very small update to the referential data, which is also highly shared data. Because the size of the update is so small, the internode communications overhead for accomplishing this update makes the operation very costly and slow, which can reduce substantially any performance advantages provided by deduplicating data.

To achieve the best deduplication reduction rates, all incoming data may be compared to all data already residing on the storage system. This may be referred to as a "global" deduplication system. For example, non-global deduplication systems may divide data into deduplication sets to reduce the cost of comparisons, but such systems do not achieve as high a deduplication rate as global deduplication systems. Accordingly, examples herein are generally directed to global deduplication, but some of the techniques herein may also be applied to non-global deduplication, as will be apparent to those of skill in the art having the benefit of the disclosure herein.

For any storage system, the data eventually may be stored on persistent non-transitory computer-readable media, such as in blocks of storage. Therefore, an initial task of a deduplication system may be to divide an incoming data stream into a plurality of "sized" deduplication data portions that can be matched against other stored deduplication data portions. These deduplication data portions may also be mapped to storage blocks in the storage 108, which may be of a size different from the size of the deduplication data portions, or the same size. The process of dividing and mapping an incoming data stream into a plurality of deduplication data portions may be referred to as deduplication parsing.

The deduplication data portions herein are not necessarily of a fixed size. For example, better deduplication reduction ratios may occur when the deduplication data portions are of variable size and of smaller size. This may be because the difference between deduplication data portions (i.e., the delta) may be related typically to application constructs, such as due to a document edit, and not due to a fixed deduplication data portion size or storage block size. Thus, the selection of deduplication data portion sizes may significantly affect deduplication performance and reduction ratios, and such performance may improve when the deduplication data portion sizes are able to vary to match application change constructs. Accordingly, implementations herein may use fixed or variable deduplication data portions sizes. The use of variable-sized deduplication data portions may sometimes result in larger quantities of smaller deduplication data portions and hence more burden on the deduplication index. Other than that, however, the parsing of the ingested data to one or more sizes of deduplication data portions does not affect the operation of the deduplication index.

Once the incoming stream of data is broken into multiple deduplication data portions, each incoming deduplication data portion may be compared to the existing deduplication data portions already in the system to identify duplicates. The deduplication processing herein may employ an efficient data portion ID and related indexing methodology to efficiently search for matches. Since comparing full data portions is expensive, most deduplication technologies generate a "fingerprint" or other data-portion identifier for each deduplication data portion that is far smaller than the actual full data portion of bytes, but which, at least in part, represents the content of the respective deduplication data portion. Schemes for calculating data portion fingerprints or other data-portion identifiers can vary significantly. For example, the data-portion identifiers may be generated using a hashing algorithm, data portion content/stream location information, or by other techniques. A global deduplication index of data-portion identifiers can be generated and stored for fast identification of duplicate data portions. Generating of the deduplication index may be referred to herein as deduplication indexing, and the process of calculating, storing, and matching data-portion identifiers may be referred to herein as "deduplication data portion classification". In addition, implementations herein are not limited to hashed-based deduplication. Rather, some implementations may employ byte-differential methods. In such a case, the outcome of classification may be that "this deduplication data portion is not an identical match, but is close to that deduplication data portion". The deduplication index implementation herein, including the non-data-portion identifier lookup schemes support this, and thus enable the deduplication index to support hash and byte differential schemes.

In addition, the deduplication index herein is not limited to a search tree or hash index, but also may include other deduplication-specific structures that allow deduplication data portion classification and referential information to be created and maintained in a deduplication environment. Further, the deduplication index may support an index API, as mentioned above, including at least operations for adding new entries, looking up existing entries, and removing entries that are no longer used. For example, as new deduplication data portions arrive in the system, each deduplication data portion may be looked up by data-portion identifier via a lookup call. If the data-portion identifier is not present in the index, the data-portion identifier for the deduplication data portion may be added via an add call, along with corresponding referential data. The referential data may at least contain at least a pointer to the existing duplicate instance of the deduplication data portion along with a reference count indicating how many instances of data refer to the particular deduplication data portion. If the data-portion identifier is present, the index returns the corresponding referential data so that metadata to the shared deduplication data portion may be persisted. As files or other objects are deleted or retired from storage, a remove call may be used to remove the corresponding index entry.

The result of deduplication data portion classification is often binary, i.e., a given data portion may classify as either unique or a duplicate of an existing data portion. When a data portion is unique it is stored in full along with the necessary metadata updates. When a data portion is a duplicate, the storage system avoids writing the data, but instead tracks references to the existing duplicate data portion, typically by metadata updates. Further, some deduplication systems may include delta data portions, which may be former duplicate data portions that have been updated, and that include referential metadata that points to overlay changes that can be used to build the updated versions of the data portions when desired.

After a deduplication data portion has been classified as a unique deduplication data portion, the entire data content is stored in the storage and the data-portion identifier for the unique deduplication data portion is also added to the deduplication index. On the other hand, if the deduplication data portion is classified as a duplicate, only a metadata reference to the deduplication data portion is stored. Storing a reference should be faster than storing a full deduplication data portion plus updating the index. However, workloads that are mostly or completely unique often run significantly slower in conventional deduplication systems than in non-deduplication systems because of the additional indexing work required. On the other hand, when storing data with high levels of duplication, the deduplication system may often perform faster than non-deduplication systems.

In addition, the deduplication processing may also be useful for data replication. Replication may include the movement of data resident at a source location to a target location, such as over a network connection. Accordingly, deduplication is also useful for data replication since deduplication reduces the total amount of data that is transferred from the source location to the target location. For instance, if the source system can learn what data is already on the target system, the source system can transfer far less data and avoid huge transfer costs. This may be accomplished with a deduplication negotiation protocol. However, as the physical separation between source location and the target location increases, deduplication negotiations can become significant because bandwidth is reduced and latencies are elongated, i.e., as the distance between the source and the target increase, latencies tend to slow down the data transfer. For example, on-the-wire deduplication negotiation protocol may utilize a large number of remote index lookup operations to minimize the data that is replicated. Many conventional deduplication replication systems struggle with the latencies and only achieve advantage when most of the data already exists at the target location. Regardless, deduplication replication may be affected by similar architecture issues as deduplication of data storage, particularly in clusters. In addition, source dedupe (e.g., the ability of a client to reference the index to only send unique data on ingest) is another "data moving" scheme to which the index herein may be applied. Thus, methods and techniques that improve classification or referential metadata access and cross-node sharing may be useful for replication as well.

The deduplication processing herein may be inline deduplication or post-process deduplication. For instance, inline deduplication may be performed as the data is received and before the data is stored to the storage 108. On the other hand, post-process deduplication may be performed after the data has been received and placed into what is typically a temporary storage location. Inline deduplication may reduce the performance requirements for the storage and, accordingly, implementations herein are described in the environment of inline deduplication, but are not limited to such, and may be similarly applied to post-process deduplication, such as post-process hash-based deduplication or byte-differential deduplication.

In the example of FIG. 3, the deduplication components 126 include a parser 302, a classifier 304, and a persistence engine 306. The deduplication components 126 may execute on each service computing device 102 configured for deduplicating data. In this example, suppose that the deduplication components 126 receive incoming file data 308. The parser 302 divides the incoming file data into a plurality of deduplication data portions 310, which may be of a fixed size or may be of a variable size.

The deduplication data portions 310 are received by the classifier 304, which may build a data-portion identifier 312 for each deduplication data portion 310. As mentioned above, comparing full deduplication data portions with each other would be computationally expensive, so one alternative is to generate a data-portion identifier that is representative of at least a portion of the content of each deduplication data portion, and that is far smaller than the actual deduplication data portion. Various types of data-portion identifier generating techniques may be employed, such as hashing, or the like. Alternatively, the data-portion identifiers may be complex or similarity based and/or may be composed of a reference plus one or more delta bytes. Thus, the data-portion identifiers herein are not limited to hash-based schemes.

The classifier 304 may then compare the data-portion identifiers 312 with a plurality of existing data-portion identifiers corresponding to data already stored in the storage 108. The existing data-portion identifiers may be indexed in a deduplication index 314 that includes a plurality of data-portion identifiers of stored deduplication data portions, and that is accessed by the classifier 304 for fast identification of duplicate data portions. If the classifier 304 finds a match, the classifier 304 may perform additional processing to ensure that the data portions are actually duplicates, such as by performing a bit-by-bit comparison of the matching data portions or through other techniques. Thus, the classifier 304 may classify the incoming data portions as either duplicate data portions 316 or unique data portions 318. In the illustrated example, data portions 1, 2, 4, and 5 are unique, while data portions 3 and 6 are duplicates of data portions already stored in the storage 108.

The incoming duplicate data portions 316 may not be stored in the storage 108. Instead, the persistence engine 306 may include a metadata handling service to create and store referential data as metadata 320 which points to the matching data portions already stored in the storage 108. The persistence engine 306 also creates metadata 320 for the unique data portions 318. Further, the persistence engine 306 may add the data-portion identifiers 312 for the unique data portions 318 to the global deduplication index 314. Thus, the metadata 320 may include reference and index information. The persistence engine 306 may store the metadata 320 and the unique data 322 in the storage 108. The persistence engine 306 may also be the "file system" proper, joining the protocols, classifier, and storage together into one system.

In cluster systems, the deduplication components 126 executing on individual nodes may depend on a coordinator, such as a coordination service 324, to ensure data integrity at all times. Thus, the deduplication components 126 may be a client of the coordination service 324. As one example, the coordination service 324 may be a centralized service, such as a DLM, or the like, that functions as one of the parts of the overall coordination services. For example, the coordination service 324 may issue locks for shared resources, such as data blocks, files, directories, areas of shared memory, data structures, all or part of a database, disks, volumes, arrays, and so forth, to sequentially control access to the shared resources.

When the deduplication components 126 ingest a large amount of unique data, there is more overall work performed and more accesses to the index. For example, the entire index 314 may be searched and, when a match is not found, the unique data is written to the storage 108 and a new entry is added to the index 314. Additionally, handling of duplicate data and corresponding referential updates may be difficult in clusters because the referential data is often highly shared, very fine-grained in nature, and requires close mediation.

Figure 4:
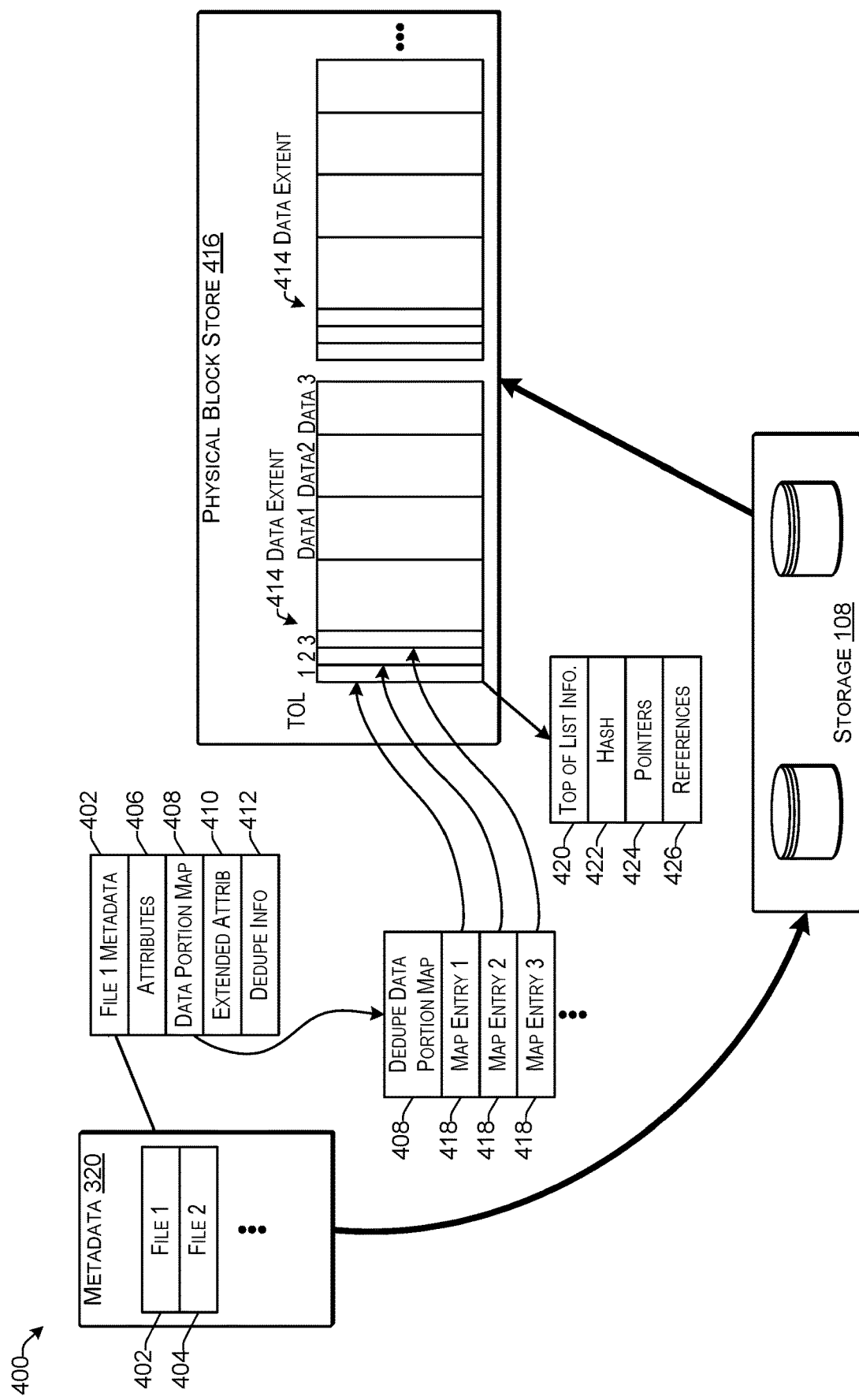
FIG. 4 illustrates an example of storing ingested deduplication data into storage according to some implementations.

FIG. 4 illustrates an example 400 of storing ingested deduplication data into storage according to some implementations. As mentioned above, after the ingest stream of incoming data is divided into deduplication data portions and classified as either unique deduplication data portions or duplicate deduplication data portions, the persistence engine 306 stores the deduplication data. Storing any retrievable data, including file or object data, may employ the use of descriptive metadata. This metadata allows the sequential structure of a file or object to be represented for proper read-back. In general, metadata formats may include at least two pieces of information: file/object attributes and file/object deduplication data portion maps. In traditional non-deduplication system, each file owns its own unique set of data portions that are not "shared" data portions. On the other hand, the persistence engine 306 herein may generally store the traditional metadata information along with extended deduplication-specific metadata. This deduplication-specific metadata supports the mapping of deduplication data portions to data storage blocks, additional referential information (e.g., duplicate data portion reference counts and/or related structures), data-portion identifiers, and the deduplication index.

In addition, the index techniques herein may be used for both block-based storage systems and file-based storage systems. Furthermore, in some examples, the deduplication data portions may be blocks that are the same size as the data storage blocks used in the storage 108. Accordingly, the deduplication index may be employed in a storage environment in which individual storage blocks are fingerprinted by generating data-portion identifiers and indexed. In such a system, additional parsing of the data is not necessary, and the data-portion identifiers may also serve as integrity check structures in some cases.

In the illustrated example, the metadata 320 includes metadata for a plurality of files, including a first file 402 and a second filed 404. As an example, the first file metadata 402 includes attributes 406, a deduplication data portion map 408, extended attributes 410, and deduplication information 412. For instance, the attributes 406 may include file name, file size, file owner, and so forth. The deduplication data portion map 408 may indicate where the data for the file is stored in one or more data extents 414 in a physical block store 416 in the storage 108. The extended attributes may include deduplication specific attributes such as additional referential information, and the deduplication information 412 may include data-portion identifier information, deduplication index information, or the like.

The deduplication data portion map 408 may include a plurality of map entries 418 that each point to information that indicates the storage location of data portions that are included in the first file. Thus, the map entries 418 may each point to information in a data extent 414. Further, each data extent 414 may include top of list information 420, which may include hash information 422, pointers 424, and references 426. Thus, the map entries 418 may point to pointers 424 that point to the actual data portions. References 426 may indicate how many files share the same data portions.

When the deduplication processing stores unique deduplication data portions, metadata including attributes and data portion maps is written, the data itself is stored, and the deduplication metadata is updated, which may include updating the deduplication index and reference counts. In addition, when the persistence engine stores duplicate data, the metadata is updated to include referential data, which indicates that more than one file/object share a data portion. This may include referential data to track files or other object that use the shared data portion.

In addition, when a file including a duplicate data portion shared with another file is updated, the duplicate data portion may be split in two, with a resulting unique version and the shared version. The global deduplication index 314 and referential data may also be updated to reflect the data portion split.

Figure 5:
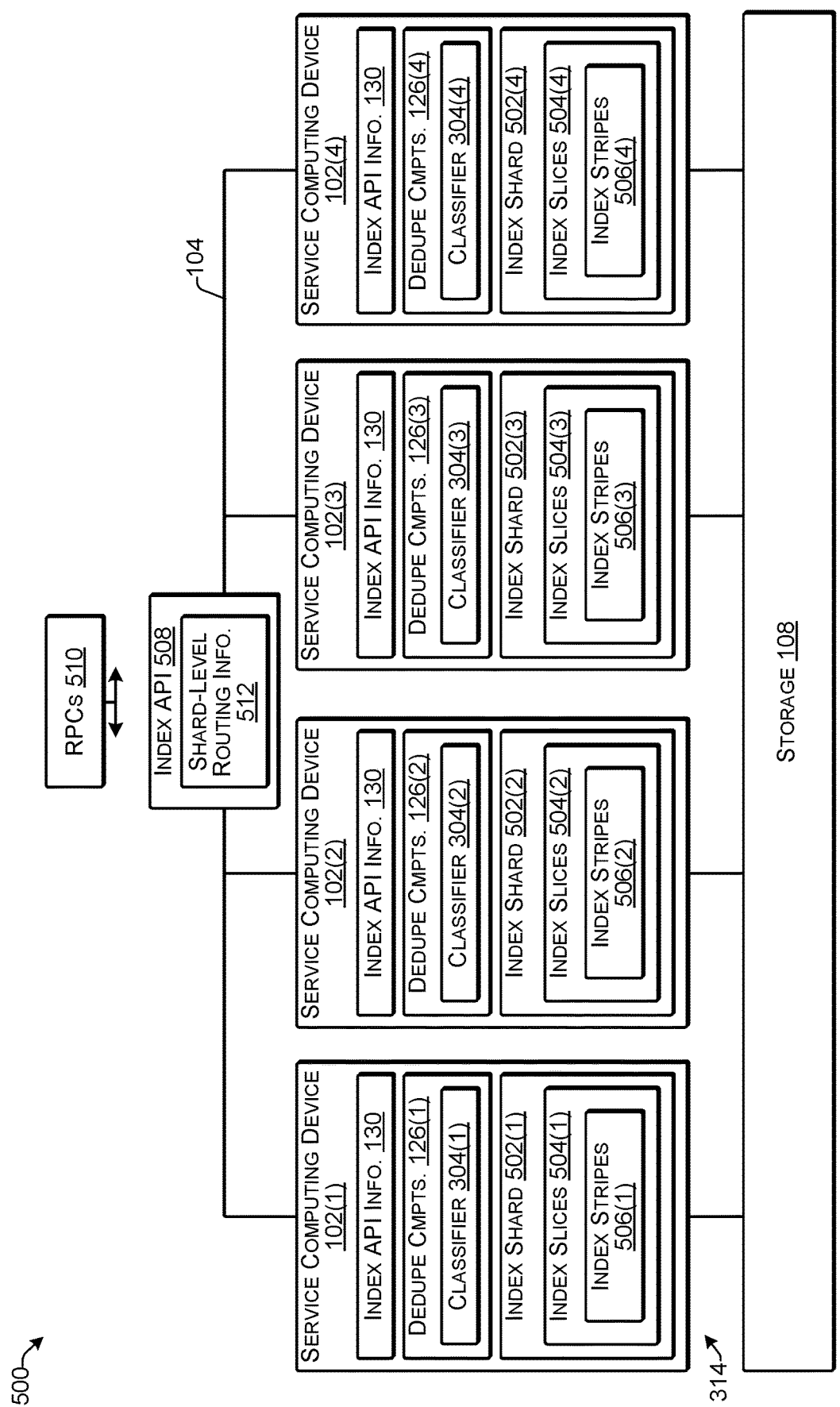
FIG. 5 illustrates an example of a storage system including a distributed deduplication index according to some implementations.

FIG. 5 illustrates an example 500 of the storage system 150 including a distributed deduplication index according to some implementations. Conventionally, an index may become too large to store in a single memory. For instance, if the storage system 150 stores one petabyte or more of data, and if each deduplication data portion is one megabyte in size (which is larger than a typical deduplication data portion), then there are billions of potential data portions, and if most of the data portions are unique, the deduplication index may have billions of entries. Accordingly, the deduplication index herein may be sharded and distributed across a plurality of nodes in the storage system 150. For single node implementations of the storage system 150, only one shard may exist. For multi-node environments, index shards may be distributed across all or some of the service computing devices based on configuration rules. In the illustrated example, the storage system 150 includes four service computing devices 102(1)-102(4), each including a respective index shard 502(1)-502(4). Collectively, these shards 502(1)-502(4) comprise the global deduplication index 314.

In addition, each index shard 502(1)-502(4) of the deduplication index 314 on each service computing device 102 (1)-102(4) may be sliced into a plurality of index slices 504(1)-504(4) respectively. The configuration of the index slices 504 may also be based on the configuration rules discussed below. Further, the index slices 504 may be striped across storage units to create a plurality of index stripes 506(1)-506(4) for each index slice 504(1)-504(4), respectively. The striping may be accomplished internally by the deduplication components 126 or other index management module, without external volume management support. Further, the stripe organization may also function as a second-level hash lookup in some cases. In addition, striping the slices across storage 108 (e.g., across storage devices) may enable lookups based on locality and/or temporal proximity. In particular, the individual stripes may store related data (as assigned to the respective stripe) and may convey order information in addition to keyed information, such as based on hash.

Additionally, the deduplication index 314 may be configured to avoid storing redundant information, and the size of the deduplication index 314 may be managed and/or limited, such as through clipping, as discussed below. Further, the deduplication index 314 may be configured to minimize the number of storage accesses for comparing incoming deduplication data portions with stored deduplication data portions, which can reduce latencies and speed up data portion classification.

In the illustrated example, the classifier 304(1)-304(4) on each service computing device 102(1)-102(4), respectively, may use an index API 508 to route requests across the shards 502, slices 504, and stripes 506 located on the respective service computing devices 102, essentially uniting the plurality of distributed index components into a coherent global deduplication index 314. For instance, each deduplication index shard 502 on a service computing device 102 that is organized into slices 504 and stripes 506 may be arranged to have at least two classification layers. These classification layers may be built on an index log and lookup structures as discussed additionally below. In some examples, an additional classification layer may exists (for a total of three layers), which may be referred to as an external temporal lookup layer. This external temporal lookup layer may be an external block cache scan list that does not employ the data-portion identifiers and that is logically independent of the deduplication index 314. Thus, the external temporal lookup layer may provide another alternative lookup path which, when available, may be applied before the searching the other classification layers.

The deduplication index 314 may be operated in different performance modes such that entries placed in the index lookup structures (not shown in FIG. 5) are placed according to the mode. These modes may be referred to as "smart modes", and may each operate according to a different algorithm to select entries to place in the lookup structures, such as for improving or optimizing performance associated with the lookup structures. The various modes may each improve the caching (memory footprint) of the lookup structures and/or may minimize lookup costs when scanning the lookup structures. In addition, the performance modes are all based on a probability of locality or temporal ordering, e.g., if a key for a duplicate data portion has been received, other related keys may be stored close to that key. Accordingly, implementations herein may rely on alternate lookups to find these related keys. Each mode seeds the "ordering" methods by selecting which keys go into the lookup structures and how the "ordering" groups are stored, such as based on temporal ordering. Additionally, some methods to speed lookups, including negative lookups, may be included at the stripe level. Further, as discussed below, both the index logs and the lookup structures may be configured as "paging" structures. These structures may be configured so that the entire deduplication index 314 exists in memory, or may be configured so that certain portions of the deduplication index 314 are stored in memory, as desired.

The index structures are configured to be extremely memory efficient. As one example, full data-portion identifiers are not stored in memory, but instead, surrogate keys may be calculated from the full data-portion identifiers and stored in memory in a lookup structure that may then be used to find a particular full data-portion identifier. For instance, the surrogate keys may map to or otherwise point to a small set of data-portion identifier locations in the index log that allow full data-portion identifier to be found. Thus, the use of surrogate keys may enable billions of keys to be stored in memory. Accordingly, the deduplication index 314 is able to cover a very large storage space and enable scaling of capacity for both single-node and multi-node environments. Further, all the index structures herein may be fully recoverable, i.e., all index structures may be lost, corrupted, or dropped and may be fully rebuilt from data stored in storage 108 by the persistence engine, or the like.

The index API 508 may support index client API calls used by index client modules for sending index requests, and index server API calls used by index server modules for responding to index requests. The index client API calls may include the three API calls described above, namely add( ), lookup( ), and remove( ). In some examples, the add( ) call may support atomic lookup and add semantics with appropriate flags, but the default add( ) call herein may typically be called after a lookup( ) and may avoid re-verifying the existence of an entry. Further, the client API calls herein may be used for a single item or a batch of items.

An index item in this context may include a data-portion identifier for a deduplication data portion and may further include referential information for that deduplication data portion. The deduplication index 314 does not require any particular form for these two structures. For instance, the deduplication system implementation may dictate the form of the items stored in the index, and the deduplication index 314 may handle these structures as opaque values. Thus, the deduplication index is somewhat independent of data-portion identifier format and type, and different types of data-portion identifiers may be used in different implementations. The function of the deduplication index is also not dependent on the information stored per data-portion identifier; rather, it is opaque, allowing the index to be used in a variety of ways, such as with file-based systems, block-based systems, with strong data-portion identifiers, weak data-portion identifiers, and so forth. Consequently, to the deduplication index 314, the actual form of a data-portion identifier may be a first sequence of bytes able to identify a particular data portion, and the referential information may be a second sequence of bytes able to indicate a location of the data portion.

Furthermore, while the term data-portion identifier is used herein for convenience, this term is not intended to be limiting, and may include any representation or other identification of the data of a corresponding deduplication data portion. Thus, numerous different formats may be used for the data-portion identifiers and referential information. The data-portion identifiers herein may be generated using any known techniques and are not limited to data-portion identifiers generated using hash functions. As one example, the storage system 150 may use 16 or 20 byte data-portion identifiers and 28 bytes of referential information. As another example, the storage system 150 may use 32 byte data-portion identifiers and 64 bytes of referential data. However, any other sizes and formats for the data-portion identifiers and referential information may be used herein so long as these structures are able to be used for the described functions.

Additionally, while byte ranges in the data-portion identifiers have been described as one technique for routing an index item, implementations herein are not limited to this technique, and other techniques may be used. For example, an algorithm may load balance based on dynamic feedback or the like. Thus, the data-portion identifiers, or portions thereof, along with other available context (e.g., number of nodes, load on nodes, operational state of nodes, etc.) may be used to select a particular shards, slices and stripes for attempting to locate a matching data-portion identifier. Further, some examples may make selections based on incoming port types and event application types. Accordingly, in the implementations herein there may not be one byte-range algorithm, but rather, a class of distribution algorithms that may include an algorithm that distributes index items based on byte ranges in the data-portion identifiers.

In addition, the index API 508 may support index server calls used by index server modules. The index server modules may support local calls or remote procedure calls (RPCs) 510. The remote calls may be from other index peers, or from external applications such as client-side deduplication components (also referred to as source-side deduplication) and various data movers. For example, when an index client module (e.g., included in the classifier 304(1)) on the first service computing device 102(1) sends a request to an index server module (e.g., included in the classifier 304(2)) on the second service computing device 102(2), an RPC 510 may be used. As one example, index access requests, and corresponding responses may transit the cluster network 104 discussed above with respect to FIG. 1. Further, in some examples, the classifier 304 of the deduplication components 126 may include an index client module for sending index requests to other service computing devices 102 and an index server module for responding to index requests from other service computing devices 102. In other examples, these client and server modules may be included in other programs, applications, or software, and/or may run independently on top of the OS.

The index API 508 may be provided to each service computing device 102 as part of an index library. For instance, the index library may be included in the index API information 130 discussed above with respect to FIG. 1. The API library may include routines for packing and routing the classification requests and responses for each call to the appropriate index server components.

The index API 508 may include shard-level routing information 512 that enables index calls to be routed to the proper service computing device, e.g., a service computing device having the index shard 502 that corresponds to a particular data-portion identifier. The routing may be performed based at least in part on the content of the data-portion identifier. For instance, the sequences of bytes that make up the data-portion identifiers may be broken into ranges that are assigned to specific shards 502 on specific service computing devices 102.

As an example, a lookup call may be directed to a particular service computing device 102 that is known to have a respective index shard 502 for a particular range of data-portion identifiers including the data-portion identifier that is the subject of the lookup call. Accordingly, it is not necessary for all the index shards 502 on all the service computing devices to be searched since each shard 502 only includes data-portion identifiers in a particular range. Thus, the deduplication index 314 may be internally segmented, meaning that the deduplication index 314 is divided into a subset of stored components, i.e., the shards 502, but each of these shards 502 is accessible transparently via the API routing mechanisms and, together, all the shards 502(1)-502(4) may encompass the possible ranges of the data-portion identifiers for shard routing. Further, as the deduplication index 314 is segmented by shard 502, slice 504, and stripe 506, and each of these segments may correspond to a different range of a portion of the data-portion identifiers. This three-level organization reduces the computational cost of locating a matching data-portion identifier in the deduplication index 314.

In some examples, the routing of an index request to a computing device may be dynamic. Since redundant shards may be maintained on a computing device 102 (and often are as service computing devices 102 are added to the cluster and the index is rebalanced), it is not necessary for a one-time only mapping of a data-portion identifier portion to computing device to be maintained. Rather, shard-level data-portion identifier routing requests may be distributed based on, e.g., data-portion identifier portion range and other criteria, and therefore may target different service computing devices 102 at different times. A receiving service computing device 102 may attempt to classify a received index request or may forward the request. For example, if the receiving service computing device 102 has the value in its cache or persistent structures the receiving service computing devices 102 can resolve the index request, and if not, can forward the request to another service computing device 102. Accordingly, while the shard/slice arrangement is described herein as an example of routing organization, other routing organization techniques may be employed in other examples.

During deployment, the deduplication index 314 may be initially segmented or otherwise divided into multiple index shards 502, with each individual shard 502 being stored and managed by a respective service computing device 102 in the storage system 150. Each index shard 502 may include an entire set of index structures, as discussed additionally below. When N shards are to be configured, the deduplication index 314 may be divided into N subcomponents, each assigned to one of N service computing devices 102 in the storage system 150. The index API 508 may be configured with shard range information for routing requests for particular data-portion identifier range to a particular shard 502 on the proper service computing device 102. As one example, a routine provided by the index API 502 may be used to determine a range of bytes in the data-portion identifiers that correspond to each shard 502. Further, while this technique may pre-assigned a range of index entries to each index shard 502, some round-robin processing may be performed subsequently to balance the number of index entries stored at each index shard 502. Additionally, if the number of service computing devices 102 changes, the number of shards 502 may also change, and the deduplication index 314 may be rebalanced to reflect the new mappings in each of the shards 502 present in the storage system 150 following the change.

Various techniques may be used for assigning data-portion identifier ranges to shards. For instance, as another example, the ranges of data-portion identifier values to assign to shards may be determined based at least partially on information obtained from the coordination services, such as a DLM. For instance, the coordination services may provide information for the current range assignments. As one example, the current assignment may map a relatively large subset of data-portion identifiers, so that the distribution may be controlled and may be reconfigured based on work load via cross-node coordination through the coordination services. Thus, other techniques may be used for determining the distribution of keys to shards, and implementations herein are not limited to a simple range based scheme.

The index components that make up a shard 502 provide full index functionality for the range of items mapped to the shard 502. That is, all three layers of the index are present on each service computing device 102 for each shard 502. Thus, each shard 502 is a fully functional distributed index implementation that supports the range of items assigned to that shard 502. In addition, the structures that make up each shard 502 may be stored separately from all other shards 502. For instance, a shard 502 may be located on a local storage of a respective service computing device 102, or on shared storage assigned to the service computing device 102. During normal operation, shards 502 are treated as being private to the assigned service computing device, i.e., accessible through the service computing device 102. However, during recovery, other service computing devices 102 may be able to access a shard 502 of a failed service computing device, or the like, such as under mediation of a recovery process.

The index slices 504 represent a second level of segmentation (shards 502 being the first level). Because the deduplication index 314 may support a variety of fast lookup structures (e.g., search trees, hashes, etc.) discussed below, the use of slices 504 may help keep the lookup structures relatively small and fast to search. Slices 504 are not required in the implementations herein, but are one technique for sub-dividing the deduplication index 314 to enable parallel operations.

As one example, each shard 502 may be divided into as many as 16 slices 504. All slices 504 defined for the same shard 502 exist on the same service computing device 102. Because slices 504 are an on-node segmentation of the deduplication index 314 that is internal and transparent, no remote routing is needed to access a slice 504. Once a request is present on a service computing device 102 (whether generated locally or received from another service computing device 102), a portion of the data-portion identifier bytes may be used for routing by the index API 508 for selecting the proper slice 504. Accordingly, the slice routing range may be a sub-portion of the shard routing range, i.e., a first portion of the data-portion identifier may indicate the shard range and a second portion of the data-portion identifier may indicate the slice range. In addition, each slice 504 may be supported by one or more files that constitute the slice. Slices may be split across storage devices on the storage 108 for improved performance, but the use of the stripes 506 generally makes this unnecessary.

As discussed additionally below, dividing the shard 502 into a plurality of slices 504 enables parallel searches of lookup structures and smaller lookup structures. For instance, as discussed below, each slice may correspond to a separate index log and associated lookup structure. Further, in some cases a surrogate key may map to more than one slice, in which case parallel searches can improve performance. Accordingly, when searching for a surrogate key in a lookup structure, the search may be conducted on multiple lookup structures (i.e., multiple slices) in parallel. Thus, the classifier may search a plurality of lookup structures in parallel such that the first lookup operation to return a successful result may cause the other lookup operations to be discontinued.

The stripes 506 are a further sub-division of the slices 504. As one example, each slice 504 may be divided or otherwise organized into up to eight stripes 506. Thus, the stripes 506 are a third level of segmentation in the deduplication index 314. The stripes 506 may serve as both a feature to parallelize searches and as a scheme to aggregate sequential blocks on disk media or other computer-readable media in the storage 108. As discussed additionally below, the stripes 506 may also support the units of an index log and fast lookup allocation (i.e., a stripe-group), which may include a set of storage blocks that are logically contiguous but spread across a plurality of disks or other storage devices in the storage 108.

In some examples, the stripes 506 may be distributed structures selected, e.g., based on a stripe range of a data-portion identifier portion, or by other techniques. A stripe may be organized according to a temporal/locality metric. Thus, a stripe may be selected based on a data-portion identifier range and other information, but the stripes are ordered by location and temporal order. Further, in some examples, when the stripes are temporally ordered, the stripes may be trimmed or otherwise clipped to a specific size by discarding old entries when new entries come in. So the stripes (and thereby the slices) may be size managed based on temporal ordering to ensure that the most relevant (e.g., most recent) entries are maintained in the cache first, greatly increasing probability of matching with minimal searching. The stripes 506 may also serve as a hash lookup key, effectively sub-dividing hash bucket chains for reduced scan times and improved sequential pre-fetch. Similar to the slices 504, the stripes 506 are on-node only structures, i.e., it is not necessary to provide remote routing for the slices 504 or the stripes 506. Additionally, similar to the slices 504, the stripes 506 may be selected according to ranges corresponding to a portion of the bytes in the data-portion identifiers. Further, the stripes 506 may be mapped to individual files or logical units, depending on the implementation. In addition, in some implementations, "negative" lookup optimization structures such as bloom filters (not shown in FIG. 5) may be supported and applied at the stripe level. For example, applying bloom filters at the stripe level may enable multiple smaller regular or counting bloom filters to be used. In addition, not all shards 502 and slices 504 benefit from bloom filters. Furthermore, as the bloom filters fill up, they can easily be dropped (if full) or rebuilt on a per stripe basis (and in parallel across multiple stripes). However, in some examples, bloom filters are not used because the other techniques employed herein greatly reduced the amount of data to be searched. Accordingly, bloom filters are not a required feature, but may provide some benefit in some implementations. In addition, when implemented, bloom filters may be applied on a per-slice basis in some examples.

Figure 6:
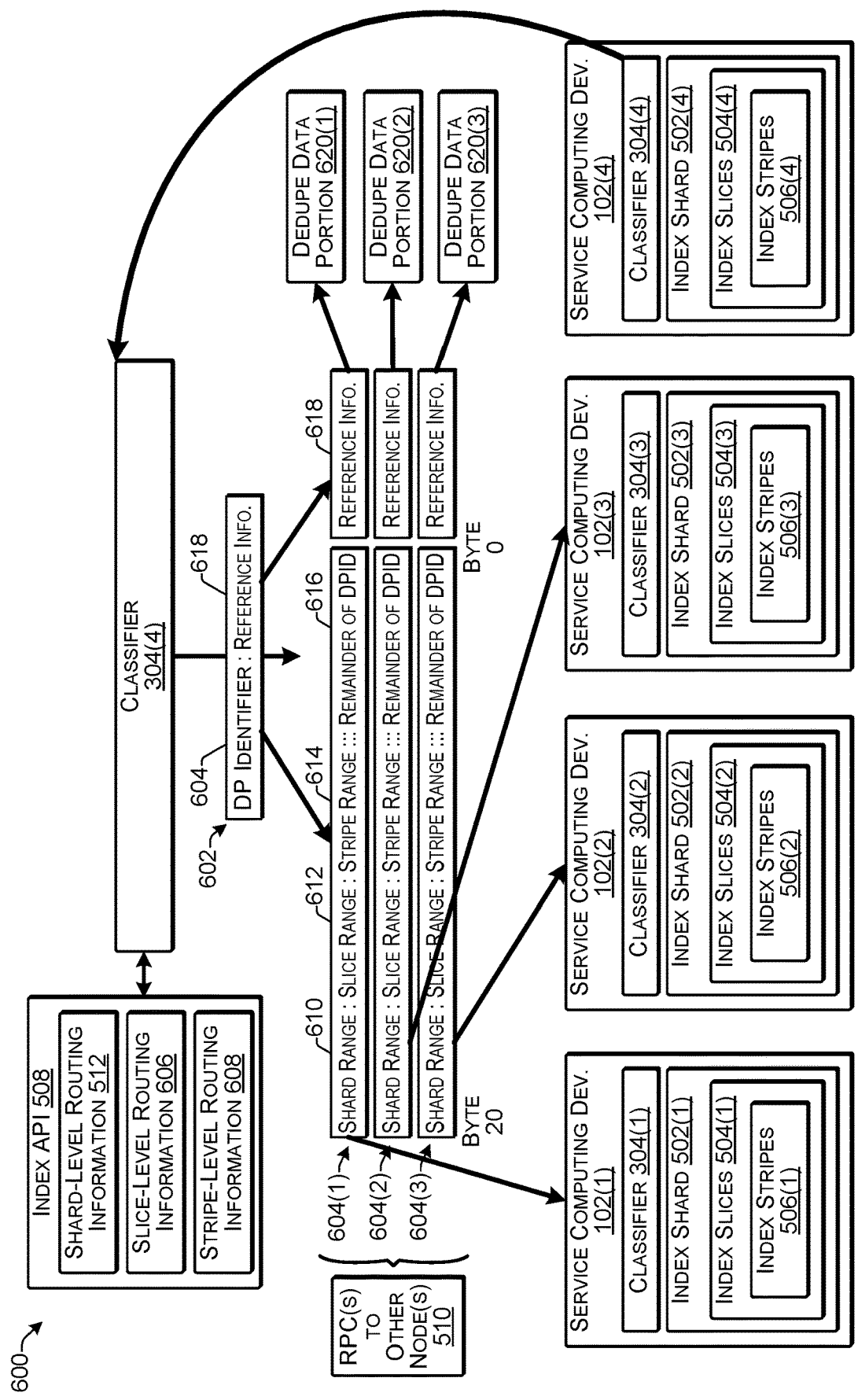
FIG. 6 illustrates an example of routing of index items according to some implementations.

FIG. 6 illustrates an example 600 of routing of index item requests in the storage system according to some implementations. In this example, suppose that the classifier 304(4) on the fourth service computing device 102(4) is performing deduplication classification and has a plurality of index items 602 for indexing. The classifier 304(4) may use the index API 508, which may include routines for routing index requests based on the content of data-portion identifiers 604 of the index items 602. In this example, the index API 508 includes the shard-level routing information 512, slice-level routing information 606, and stripe-level routing information 608. In some examples, the routing based on data-portion identifiers may be a multi-level dynamic routine scheme, rather than an a-priori fixed routine scheme.

The index API 508 may be used for routing index item requests to the proper shard 502 and the proper service computing device 102 based on a portion of the associated data-portion identifier 604 associated with each index item request. The data-portion identifiers 604 in this example include a shard-range portion 610, a slice-range portion 612, a stripe-range portion 614, and a remaining portion of the data-portion identifier 616. As one example, suppose that the data-portion identifier extends from 0 to 20 bytes. The shard-range portion 610 may be a first portion of the bytes, the slice range portion may be another portion of the bytes, and the stripe range portion may be a third portion of the bytes. Of course, numerous other data-portion identifier sizes and range sizes may be used in other examples. Further, other ranges and other routing techniques may be used.

For data-portion identifiers in which the shard-range portion 610 corresponds to the fourth shard 502(4) on the fourth service computing device 102(4), the remainder of the routing is handled internally by the classifier 304(4) on the service computing device 102(4). On the other hand, if the shard-range portion 610 indicates a shard on a different service computing device 102, the classifier 304(4) may use the index API 508 to send a RPC 510 to the correct service computing device 102. For example, as illustrated in FIG. 6, a first data-portion identifier 604(1) is routed to the first shard 502(1) on the first service computing device 102(1), a second data-portion identifier 604(2) is routed to the third shard 502(3) on the third service computing device 102(3), and a third data-portion identifier 604(3) is routed to the second shard 502(2) on the second service computing device 102(2).

As mentioned above, the index items 602 may each include reference information 618 in addition to the data-portion identifier 604. The reference information 618 may include a pointer or other indicator of a storage location of a deduplication data portion 620 corresponding to the respective data-portion identifier 604. The reference information 618 may be sent with the associated data-portion identifier to the respective service computing device 102 when routing the index items 602 based on the shard-range portions 610.

Further, the routing to a shard 502 may be re-calculated when one or more service computing devices 102 in the original configuration are missing. For example, if the shard components are stored on shared memory, the routing may be to a service computing device 102 that has taken over from a failed or removed service computing device 102. Alternatively, in a shared-nothing configuration, the re-routing may be to a service computing device 102 that is assigned the shard range and that has received failover of the stored index from another source. Additionally, as mentioned above, the routing scheme may be dynamic, such as not only based on the number of service computing devices 102, but also based on other criteria, such as cache information. In addition, slices may be redundant which may result in more than one routing outcome.

Figure 7:
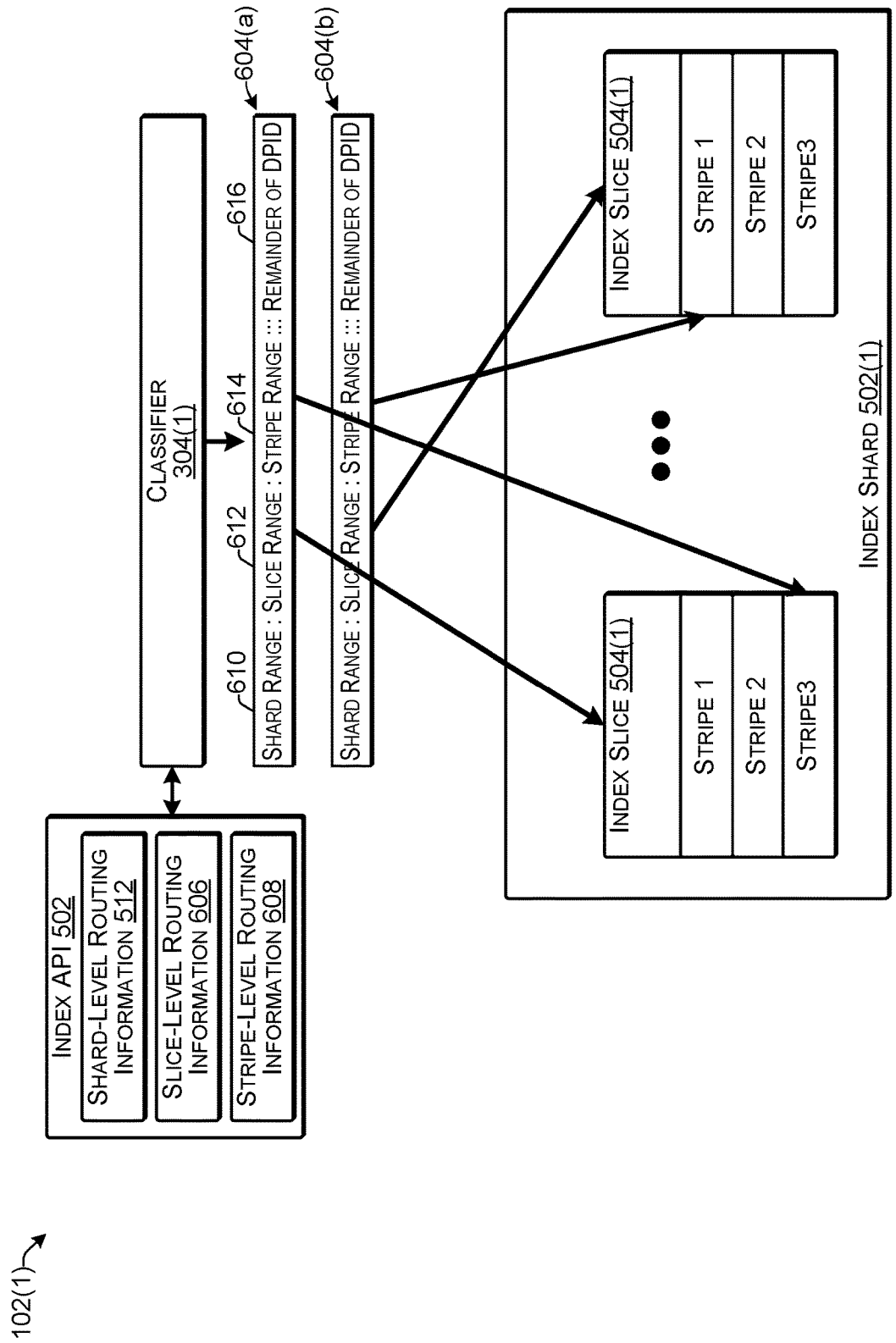
FIG. 7 illustrates example of routing of index items according to some implementations.

FIG. 7 illustrates an example of routing index item requests on the service computing device 102(1) according to some implementations. Once the index item request is on the correct service computing device 102, byte ranges 612 and 614 in the data-portion identifier may be used to route the index item requests to the proper slice 504 and stripe 506, respectively. This three-level segmented structure, along with the routing algorithms, provides a global view of the deduplication index 314. The algorithms used to route requests to the different segment levels may vary, but generally may be based on dividing the data-portion identifier into a series of item ranges in a hierarchical order. The logic for accessing the deduplication index 314 may be described as: (1) route item request to service computing device 102 having correct shard range; (2) determine slice 506 having correct slice range; and (3) determine stripe having correct stripe range; and (4) locate entry on the determined stripe.

In addition, in some examples, the internal block structure of the storage may include a table of contents (TOC), which is a per-block lookup structure that may be maintained in memory. The TOC may also be loosely temporally ordered by file. Further, the TOC is outside of the global deduplication index proper, but may be used as a fourth layer of lookup that allows lookup in some cases without accessing the global deduplication index. This also means that global deduplication index lookups that resolve to blocks with TOC's can be directed to a computing device that may have these blocks cached in memory, thereby avoiding unnecessary access to the storage 108. Accordingly, the deduplication system includes a plurality of lookup components, of which the global deduplication index is one. However, implementations herein also may enable alternative local cache lookup-schemes to avoid unnecessary use of global index.

In the illustrated example, suppose that the classifier 304(1) on the first service computing device 102(1) receives, based on shard-level routing, a first index item including data-portion identifier 604(a) and a second index item including data-portion identifier 604(b) based on the respective shard range portions 610 of these data-portion identifiers. The classifier 304(1) may use to the index API 508 to determine the correct slice 504 and stripe 506 for each data-portion identifier 604(a) and 604(b). Accordingly, in this example, based on the respective slice ranges 612 and stripe ranges 614, the data-portion identifier 604(a) is routed to stripe 3 on slice 504(1) and the data-portion identifier 604(b) is routed to stripe 1 on slice 504(N). Furthermore, while an API is used in the examples herein for performing the routing, in other examples, routing routines may be included in the classifier 304, and the API might not be used. However, use of the index API 508 enables centralized authoritative modification of the routing ranges, shard locations, and the like, without having to modify the information at each instance of the classifier 304. Other variations will be apparent to those of skill in the art having the benefit of the disclosure herein.

The multi-segmented architecture of the deduplication index 314 having three hierarchical levels is described above. The deduplication index 314 may also be multi-layered, which indicates that after an index request is routed to the appropriate segment, that segment may include several layered software structures that enable access to the component. As mentioned above, the data-portion identifiers/surrogate keys may be used in two layers, while the third layer and/or TOC fourth layer are direct cache lookups that do not rely on data-portion identifiers.

Figure 8:
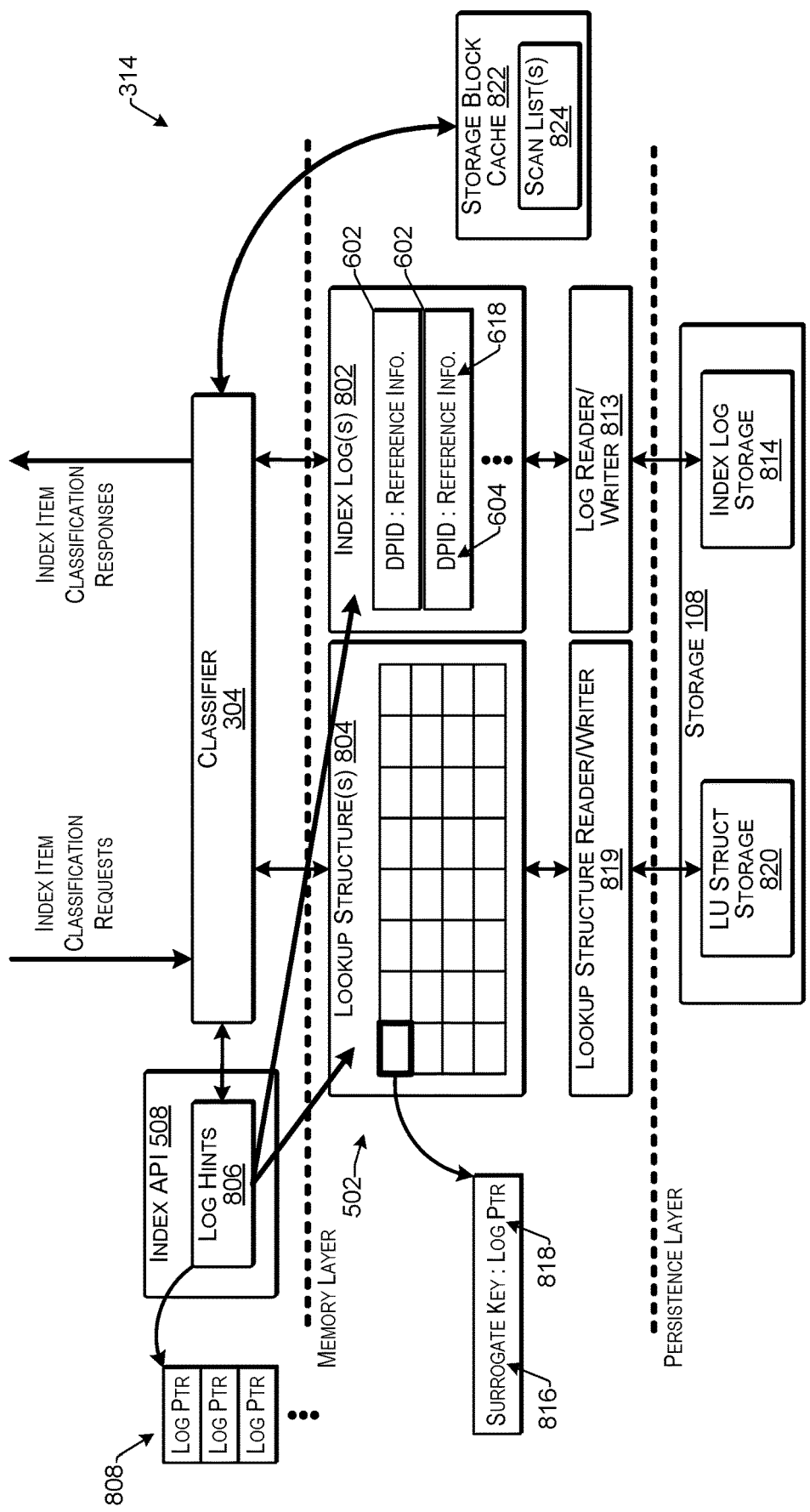
FIG. 8 illustrates an example shard configuration according to some implementations.

FIG. 8 illustrates an example of a shard 502 of the deduplication index on a service computing device according to some implementations. In some examples, two layers of access structures may exist. These layers may include an index log 802 and a lookup structure 804, such as a hash map. For instance, a simple index typically provides only one means to lookup an item, i.e., the primary key. In deduplication, this key may be the data-portion identifier. Consequently, every item placed in the index includes a key that references that item. In these simple indexes, the key often exists in a very sparse space. For example, the data-portion identifiers may be complex hash-like structures that appear very random. This makes index sizing problematic and effectively spreads incoming keys to throughout the index. Further, in this type of index, there is really no way to predict the next key that may come in, so there is no opportunity to improve index performance.

Accordingly, some implementations herein include multiple local deduplication indexes (i.e., distributed index portions), with a different or secondary key that can be used to find an entry, and which may provide multiple lookup paths to a single index item. For instance, some implementations include a secondary key to enable looking ahead to improve performance. As one example, enabling more than one lookup path may be advantageous when group or location information is proximity based, e.g., proximity on storage (referred to herein as chunk clustering) or proximity to other items that arrived within a certain time frame (referred to herein as temporal proximity). These alternate indexes may provide optimization opportunities to find entries faster than searching based on a per-data-portion identifier lookup. Further, the provision of multiple lookup paths may enable quick lookup of duplicate data portions at low cost using a first possible lookup path, with alternative lookup paths being available as fallbacks.

As an example, suppose that the same file is ingested at two different times (e.g., a first backup on Monday, then a second backup on Tuesday). If the file has not changed, not only may all the data chunks come in the second time, but the chunks ingested are likely to be ordered the same or close enough to the same that the original order is detectable. In such a case, implementations herein may determine the data that is likely to arrive next and may pre-load the deduplication index 314 for fast operation. In some examples, an index based on data-portion identifiers may be referred to as "unordered" or "random" index due to the properties of the sparse data-portion identifiers, and the alternate indexes herein that use some location or time information for a key may be referred to as "ordered" indexes, which may denote that these indexes are far less sparse and may be optimized base on expectations regarding order or groupings. Further in some examples, the ordered indexes herein might not employ a one-to-one mapping of keys.

When the deduplication index is used for block-based storage systems (such as in some types of storage arrays), temporal locality may be based on block arrival (since blocks of data are received, rather than files) and on block locality (i.e., locations of data blocks in storage 108, e.g., on disk). Thus, in some examples, the temporal ordering may be a soft ordering based on data-portion identifier order, i.e., the time at which index items including data-portion identifiers are routed to/received at a particular computing device. Thus, the data-portion identifier order in the index logs may be related to file order for file-based storage systems and block order for block-based storage systems. In other words, the temporal ordering of the received data portions may be a relative ordering based on the way data is presented by a hosting deduplication system. Thus, the index logs may not be ordered based on the data-portion identifier numbering or values, and instead may be ordered based on one or more of physical location of data in the storage, strong temporal ordering, loose temporal ordering, file ordering, and so forth. As one example, the ordering may be loose temporal ordering according to file and physical location on storage.

In addition, in some implementations, to achieve non-index based alternate lookups, the data may be stored in such a way that similar data is grouped together. This may occur in part due to sequential ordering of files. Further, the mappings to the actual constituent chunks may be managed to support an inference of locality (temporal or physical). In addition, some examples may include a mechanism to jump from data-portion identifier-based index lookups to the alternate ordered lookup techniques. Further, the ordered lookups may be accomplished in groups and not on a one-to-one basis. Additionally, the alternate lookup paths herein are designed to minimize the memory footprint and add little additional overhead.

As discussed above, the index shards 502 may be divided into a plurality of slices that are contained within each service computing device 102. In some examples, the slices may be further divided between the lookup structure 804, the index log 802, and a dynamic ordering of log hints 806. The log hints 806 may include at least a listing of a limited number (e.g., 4, 8, 16, etc.) of log pointers 808 corresponding to recent duplicate matches. These may serve as alternate lookup paths that occur at and below the slice level. For example, because entries in the index log are added as received, entries received close together in time are located near to each other in the index log 802. Thus, if data is being ingested that is a duplicate of data that has already been stored in the system, a plurality of duplicate data portions will be received together. Further, when the location in the index log of an entry corresponding to one of these duplicate data portions is known, then when the next deduplication data portion is received, the classifier may scan the index log near the location of the first entry to locate the entry that matches the next data portion. Therefore, access to the lookup structure may be skipped in this situation. Consequently, the logic used to traverse alternate lookup paths may be performed locally on the service computing device 102 to which an index item request has been routed.

Furthermore, the log hints 806 may be organized by any sub-grouping of data-portion identifiers (e.g., according to file, block device, file/block range, file/block checkpoint). Accordingly, the log hints 806 may include a list of pointers 808 into the index log 802 for which matches have been found, and therefore, there is a high probability of success of directly searching a limited range in the index log 802, rather than searching the look up structure 804. Furthermore, the log hints are inherently dynamic and are automatically aged out as new hints are added to the list of log hints. Alternatively, hints in the hint log 806 may be persisted (optionally, along with a related structure such as a file or a checkpoint).

In addition, when multiple slices and corresponding index logs are employed per shard, the ordering may be horizontal (e.g., partial ordering in slice and full ordering across all slices). Consequently, alternate lookup algorithms may be employed and may vary based on slice configuration, which may lead to better parallel operation. Further, the hints might no longer point to a single index log, but to relative locations in multiple per-slice index logs that may be searched based on the hints.

In some examples, a set of index items that represent a chunk of data are eventually routed to a specific slice. Consequently the slice may be described as containing "every Nth entry" when the data-portion identifiers are distributed uniformly among a plurality of N slices. Accordingly, strict order may not be required for alternate lookup, nor is a one-to-one lookup model. Rather, the performance optimizations employed herein are designed to work on partially ordered partial sets at the slice level. In addition, when these schemes are applied to a common log, implementations herein are able to reassemble the partial orderings for approximating a fully ordered model. This partitioned partially ordered model (and the related lookup paths) have the benefit of also enabling efficient handling of access from non-ordered applications and access methods, such as may be divided into N-wide partially ordered subsets where N is the number of slices on a node. In addition, in some examples herein, the alternate ordered lookup paths and methods are called the fast" lookup path. The term "fast" may indicate the avoidance of walking the data-portion identifiers in the index log (e.g., by traversing a plurality of data-portion identifier hash tables), which are very sparse, and which may induce frequent storage access operations. Some examples may store the minimum number of keys to approximate every "Nth" key. For instance, rules such as "is the index item the first of a file", "is the index item the first/last of a duplicate range", or "does the index item fit a known pattern, such as a zero-filled block" may be applied when selecting keys. If all the rules for selecting index items result in a gap larger than every Nth key, then implementations herein may store the extra key to keep the selection distribution balanced. Thus selecting every "Nth key" is one example of reducing the number of surrogate keys that are stored in the lookup structures.

The index log 802 may be configured to support the configured slices. A typical configuration may be one index log 802 (and, accordingly, one lookup structure 804) per slice but that is not mandatory, and alternative configurations may be used. As one example, the index log 802 may maintain a sequential record of index items that arrive at the service computing device 102 and provide a loose temporal ordering (i.e., items that are close are known to have arrived in order at around the same time). The temporal ordering may be inferred and need not be supported by explicit time based key information, timestamps, or the like. Thus, the index log 802 may enable temporal clustered locality searches. As one example, if a first ingested data portion is identified as a duplicate data portion, the next data portion after that data portion is also likely to be a duplicate, and accordingly, the data-portion identifier for a duplicate of that data portion may be located temporally near to the data-portion identifier for the first data portion in the index log 802. Accordingly, a quick scan of that portion of the index log 802 may be performed to attempt to find a data-portion identifier that matches the next data portion, rather than a search of the lookup structure 804. This is the purpose of the log hints 806, i.e., to enable a direct search of a small portion of index log 802 based on a prior hit. In some examples, the index log 802 may be managed as a disk log, meaning that an area of storage is reserved for the index log 802, and writes to the index log 802 may be sequentially written to the storage location by appending the additional writes in storage. Thus, the sequence of the index log 802 in storage may correspond to the logical structure of the index log 802 and may enable very fast adds to be made to the index log 802 on disk.

The index log 802 may be the final location destination of all index items 602 (index entries including a data-portion identifier 604 and corresponding reference information 618) that exist in the index shard 502. Accordingly, the sum of the index logs 802 on each service computing device 102 may be the primary persistence for all data-portion identifiers and related referential data. In some examples, the index log 802 may be configured as an append-centric-structure, such as the disk log mentioned above. Further, the index log 802 may be able to reclaim space and re-use old entries (e.g., as index items 602 are deleted), but tends to grow as deleted entries are aggregated into pools of entries. This may be performed for access efficiency reasons, e.g., to place logical sequential portions of a file together for fast lookup and read-ahead. Further, some examples may employ alternate lookup mechanisms based on temporal proximity and clustered locality in a cache in memory and to allow more efficient cache read-ahead operations. The temporal locality may be file-based or block-based, and may include a relative ordering based on timing and slice configuration and may run vertical or horizontal. When the relative ordering runs horizontally, parallel lookup structure scans and/or index log scans may be performed.

The index log 802 may be configured in a "grow" mode or in a "clipping" mode. For instance the grow mode may allow the index log 802 to simply keep growing as new entries are added (unless there is deleted space that can be reused). On the other hand, in clipping mode, the overall size of the index log 802 may be predefined, and when index items 602 are added and the threshold size of the index log 802 is exceeded, the index log 802 may start replacing older entries of index items 602 with newer entries of index items 602 to maintain the size of the index log 802 below the threshold size. Accordingly, implementations herein may limit the memory footprint and, in some cases, the overall database size, by maintaining only more recent keys in memory (and/or in storage) to limit searching to what are likely to be the most relevant cases.

Data-portion identifiers 604 and associated referential information 618 may be large (e.g., 32 bytes or more), and as such may not fit well into memory in large quantities. Accordingly, the index log 802 may serve as the final destination for this data, typically in storage 108 as index log storage 814. Further, the index log 802 may be oriented to enable fast inserts (e.g., appends). In addition, the index log 802 may be used to support recovery. For example, because the entire data-portion identifiers 604 and referential data 618 are stored in the index log 802, and because the index log 802 is configured as an append structure, completed ranges of the index log 802 that map to storage blocks may be efficiently flushed to disk in the background with little front-end performance impact. For example, the index log 802 may be implemented as a cached, pageable, write-thru structure that includes recovery benefits. Additionally a log reader/writer 813 may store the index log 802 in the storage 108 as index log storage 814. For instance, the log reader/writer 813 may be included a module or routine of the persistence engine discussed above with respect to FIG. 3, and or may be included in a module or routine of the classifier 304.

Additionally, because items are assembled in groups (e.g., typically mapping to individual files/objects), when groups are committed to the log the groups generally are entered in temporal order based on the access object. This technique not only offers superior read-ahead value, but also enables simple limited search based on current object position to be performed to value-add the lookup structures. These simple limited searches may be referred to as "temporal scans" which may map to the pageable cached index log entries that are shuttled between memory and the index log in storage.

Furthermore, the index API 508 may include one or more routines to generate and maintain log hints 806 for API clients as index items are processed. The log hints 806 may be a list of locations in the index log 802 at which prior entries of interest (for the items belonging to an object) exist. The log hints 806 enable efficient movement in the sequential index log 802 (e.g., by providing seek points) to support fast lookups via item range scans. This also allows groups of entries to be deleted and reused en masse, supporting both the clustered and temporal layout of items for the stored object.

In some examples, the number of log hints 806 and control of when the log hints are refreshed may be managed according to the index API. As one example, up to 16 log hints 806 may be maintained by default, and the log hints that are maintained may be dynamically managed as new files/data are ingested. For instance, for small files, very few hints might be used. For larger files, based on the number of duplicate data portions found, many more log hints, e.g., up to a threshold number, such as 16, may be maintained. Further, the log hints 806 herein may be useful even within a single file. For example, in backup blobs of data, it may be common to see the same data over and over and the log hints 806 may be used to determine the location of an older version of a data portion to allow quick finds without traversing the full key space. Additionally, the log hints 806 may be set and/or reset by the smart mode algorithms discussed below. Thus, the log hints 806 may also be related to the sparseness and selection mode algorithms, and may be seeded by these algorithms. Accordingly, the log hints 806 may be maintained based at least partially on a probability that the same data is likely to be received again in the near future.

The log hints 806 may be managed at the API layer and may be configured globally, per-file, per-object, per-range, or per-delta. In some examples herein the typical use may be on a per-file basis. In some cases, the log hints 806 are pointers in a grouping of items that are located close together and that arrived at approximately the same time (i.e., close in proximity and close in time). For instance, the log hints 806 may point to an ordered group, and may allow upper level index code (e.g., the classifier 304) to read ahead (or behind) providing a probability-based guess on what the next data-portion identifier to arrive may be. As one example, if the same file is received twice, the data-portion identifiers will be received more-or-less in the same order so the classifier 304 is able to predict that duplicate dups with be received. The log hints 806 may function as a group locator to allow simple log searches to be launched to avoid more costly data-portion identifier lookups.

Furthermore, the combination of the log hints 806 and the index log 802 may enable natural object clustering and temporal locality. The index log 802 supports limited but extremely fast lookups of clustered or temporally adjacent items. More specifically, if a particular item has been looked up, it is likely that some adjacent items may also be looked up because these items were stored together as a group. When these adjacent items are pre-fetched and there are subsequent queries, there is no need to perform additional search through other structures, which results in a fast deduplication classification path. As one example, when searching the index log 802 for a temporal match, some examples of the classifier may perform a search both forward and backward over a dynamic threshold range of log entries, e.g., based on mode. This search enables the classifier to find not only strongly ordered entries, but also loosely ordered entries, and thereby, to a certain extent, supports "out-of-order" ingests. Thus, duplicate data does not have be received in exactly the same order as the original data, and may still be located using the log hints 806. The threshold range of a temporal search in the index log may be modified based on the number and proximity of log hints and the sparseness of the index log entries. Further, as log hints build-up, the threshold range for searching forward and backward may be adjusted to avoid needless searches. Thus, the positions of the hints in the listing of log hints 806 may also be ordered from most recent to oldest and may be trimmed based on duplicate data hit rate. Additionally, larger search ranges may be applied to more recent hints and shorter search ranges may be applied for older hints avoid searches that are unlikely to result in successful matches. Another indicator that may be used to bound index log searches may be determined by based on the index log portions already located in memory. For example, when a search starts faulting in pages in memory, the search becomes substantially more expensive. Accordingly, some implementations may curtail a search in the index log to avoid faulting ranges that cross the range of a sparse hole in the index log.

As mentioned, the index log 802 may be the final destination for all data-portion identifier and referential information that makes up the deduplication index 314. However, the index log 802 is not structured by key, so any searches other than adjacency based on log hints 806 may be costly, e.g., essentially unbounded sequential scans. Further, the index items 602 do not need to be kept in memory at all times. More specifically, the referential information 618 is only used when duplicate data portions are detected. Accordingly, a separate set of structures, called the lookup structure(s) 804 may be provided.

The lookup structure 804 may represent the first layer for index requests. For example, when the classifier 304 receives a data-portion identifier via the index API 508 that is not in the log hints 806, the lookup structure 804 may enable the location of the data-portion identifier 604 in the index log 802 to be resolved quickly (i.e., with a limited structured search). Accordingly, lookup structure 804 may serve as the primary search mechanism for any data-portion identifier 604 not recently seen.

The lookup structure 804 essentially maintains a structured tree that maps keys 816 to locations in the index log 802 using a log pointer 818. As such, no referential information is stored in the lookup structures. Furthermore, the whole data-portion identifier 604 need not be stored in the lookup structure 804. Rather, a surrogate of the data-portion identifier, referred to as surrogate key 816, may be stored along with a compact log pointer 818, which may greatly increase the number of items that can be searched in memory. For instance, some implementations may compute the surrogate key 816 from the data-portion identifier 604 so that the surrogate key 816 may be typically less than half the size of the original data-portion identifier. The surrogate keys 816 may be placed in the lookup structures 804 along with respective pointers to the respective locations of the actual data-portion identifiers 604 in the index log 802.

Suppose that the original data-portion identifier is 20 bytes, as illustrated in FIG. 6. As one example, to generate the surrogate key 816, every nth byte, such as every 4th byte, 6th byte, 8th byte, etc., may be extracted from the original data-portion identifier. The extracted bytes may be combined to generate the surrogate key 816. Thus, when searching the lookup structure 804 for a particular data-portion identifier, the classifier may first perform the same extraction process on the particular data-portion identifier being searched, i.e., extract every nth byte and combine the extracted bytes for comparison with the surrogate keys in the lookup structure 804. In some examples, the surrogate keys 816 in the lookup structure may be stored in value order or other known order, thereby enabling fast searching.

Because the surrogate key 816 may not have the same collision resistance as the full data-portion identifier 604, a single surrogate key value may map to multiple different index log entries. When this happens, the classifier may traverse the keys in succession (for example, the keys will have sorted together in the lookup structures 804), and may compare the data-portion identifier in the request against the full stored log entries in order until a match is found. Although this may sound expensive, it is not done often because the surrogate key space is still very large. Further, when this step is performed, the log cache may be loaded with "hot" pages that prime any subsequent temporal scans. Thus, the use of surrogate keys may result in a very large space savings per index item in the lookup structure.

The configuration of the lookup structure 804 may vary based on actual implementation. The entire lookup structure 804 may be maintained in memory for enabling fast lookups. Examples of suitable structures may include a search tree, such as a B-tree, a hash map, or the like. In addition, the lookup structure 804 may be packed or sparse based on the smart index settings described below. Furthermore, the lookup structure 804 may be persistent but does not need to be. For instance, the lookup structure 804 may be entirely rebuilt from the index log 802. Thus, as one example, implementations herein may include a lookup structure reader/writer 819 configured to store the lookup structure 804 in a lookup structure storage 820. For instance, the lookup structure reader/writer 819 may be included as a module or routine of the persistence engine discussed above with respect to FIG. 3, and or may be included as a module or routine of the classifier 304. Alternatively, if the lookup structure 804 is not stored, the classifier 304 or other module may rebuild the lookup structure 804 from the index log 802 on each reboot of the corresponding node.

The lookup structure(s) 804 may also be implemented as a pageable cache. That is, the entire lookup structure 804 or portions of the lookup structure 804 may be maintained in memory at any point in time. For higher performance, either the whole lookup structure 804 or a major part of it may be maintained in memory. However, the lookup structures 804 may be configured, based on the stripe model, to be paged efficiently and in search groups to minimize disk thrashing when only a portion of the lookup structure 804 is able to be maintained in memory.

The index log 802 and the lookup structures 804 may be segmented according to the shard, slice, and stripe configuration described above with respect to FIG. 5. Consequently, when considering the segmenting and the layered design the deduplication index 314 herein may be referred to as a two-dimensional index. For example, for each slice on each shard, there may be two sub-components of the deduplication index 314, namely the index log 802 and a corresponding lookup structure 804. Furthermore, unlike the segmenting model (essentially sub-divided index's), the layered model affects the way index items are searched and stored. When an index item is entered into the deduplication index 314, temporal scans (via the index log 802) may first be used to see if the index item already exists. If not, the lookup structure 804 may be consulted and, if the item is unique, a new entry may be added to the index log 802, the log hints 806, and lookup structure 804.

If an index entry is being looked up, then the log hints 806 may be used to guide a short temporal scan in the index log 802, as discussed above. In some examples, the short temporal scan is not conducted, such as if the corresponding index log entries are not already cached in memory or the index log entries exceed a staleness threshold. Additionally, if the short temporal scan based on the log hints 806 fails, then the classifier 304 may use the lookup structure 804 to determine whether the index entry already exists or is unique. Consequently, the multi-layer configuration herein enables two fast find options, namely hint based temporal scans and traversal of the lookup structure 804. Furthermore, the multi-layer configuration herein enables key structures to be split so the minimum information may be maintained in memory to further enable fast lookups. In addition, the multi-layer configuration herein enables add operations to be accelerated because of the log structure, and these operations may be scheduled in parallel with updates to the lookup structures 804. Additionally, from a multi-node point of view, all of the multiple layers of lookup are an implemented on-node, i.e., the lookup structures 804 and the index log 802 referenced by the lookup structures 804 are typically not split between nodes, and therefore exist as co-located paired structures which enable faster updates.

In some examples herein, an additional classification layer, i.e., the external temporal lookup layer, may be employed as another alternative lookup path. For instance, the persistence engine may maintain a storage block cache 822 for all storage blocks on which it operates. When multiple storage blocks are in the storage block cache 822, the multiple storage blocks may be linked into one or more scan lists 824. These scan lists 824 may be completely separate from the index structures herein, but may contain much of the same information. For instance, scan lists 824 may be ordered from most recently cached storage block to oldest cached storage block, and are naturally trimmed based on available memory and memory management.

Consequently, the scan lists 824 may be used as an external clustered and temporal scan list. For example, the scan list 824 may be used to determine if an item corresponding to a deduplication data portion already exists in the storage system 150 without having to access the deduplication index 314. In some instances, an external temporal lookup in the scan list 824 may be performed first, such as before routing an index item to another node and before performing a lookup in the index log 802 using the log hints 806 or in the lookup structures 804 using a surrogate key 816. Thus, by performing the search of the scan list 824 first, the computing device may avoid accessing the deduplication index.

Accordingly, the scan list 824 may be useful in this regard, but may be limited based on the probability of duplicate data. For example, the scan list 824 is not able to function on its own. When no blocks are stored in memory, or none of the cached blocks includes the data portion being searched for, the deduplication index 314 may be accessed. However, if the relevant blocks, with the required metadata, data, and referential data are in storage block cache 822, implementations herein may often find items via the block scan list 824 similarly to locating items in the deduplication index 314. Additionally, the storage system 150 may maintain block scan list hints (not shown in FIG. 8), similar to the log hints 806 maintained for the index log 802, but the structure may be different and less information may be used. Furthermore, as discussed above, some storage systems may include a table of contents (TOC) that may be searched outside of the deduplication index in a manner similar to a scan list 824. For example, because the on-disk deduplication data portions are coalesced into larger storage blocks with a TOC, the TOC(s) may become ordered probabilistic search lists that may be searched external to the global deduplication index.

This external temporal lookup layer may be useful in clustered environments, and is independent of the data-portion identifier routing required for deduplication index lookups, and so does not go off-node. In addition, if an item is found in the local block scan list, there is no reason to access the deduplication index, removing the need for potential off-node operations and greatly reducing the load at each shard. Accordingly, the block scan list 824 may act as the top layer that is referred to first, and the deduplication index 314 may provide the next two layers. However, not all storage systems may include a storage block cache 822, and therefore, these systems may be limited to the two classification layers, i.e., the index log(s) 802 and the lookup structure(s) 804.

In addition, in some examples, a global index log lookup may be performed that is somewhat similar to the external temporal lookup if it is performed first to avoid hitting the lookup structures 804. For instance, an index log lookup may be performed after routing the index item to the correct shard and slice on the correct service computing device. Thus, when accessing the global deduplication index, implementations herein may walk to the correct shard (level 1)

and to the correct slice (level 2), and may then apply the log scan before conducting a lookup in the lookup structure 804, if such a lookup is needed.

Figure 9:
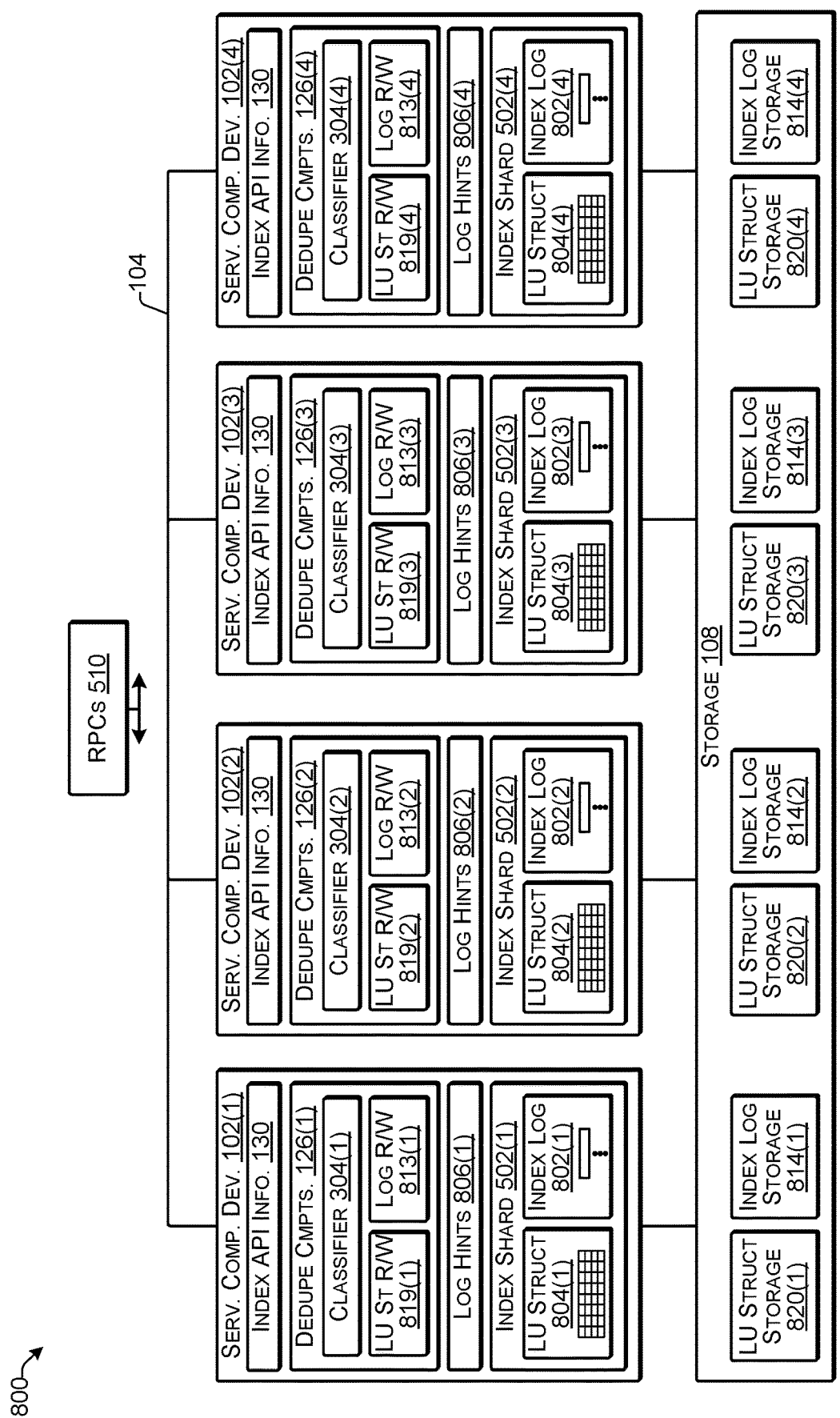
FIG. 9 illustrates an example storage system configuration according to some implementations.

FIG. 9 illustrates an example 900 of the storage system 150 according to some implementations. In this example, the storage system 150 includes four service computing devices 102(1)-102(4). Each of the service computing devices 102(1)-102(4) has a respective shard 502(1)-502(4) residing thereon. As discussed above with respect to FIGS. 5-8, each shard 502 may be segmented to include slices and stripes, and further may include at least two layers, i.e., the log index 802 and the lookup structure 804. In some implementations, there may be a log index 802 and a lookup structure 804 for each slice on each service computing device 102. Further, the log index 802 may be striped and the lookup structure 804 may also be striped. Although, for clarity of illustration, a single log index 802 and lookup structure 804 are illustrated in each shard 502 in this example, in other examples, the number of these index components configured as part of each shard 502 corresponds to the number of slices 504.

Furthermore, each service computing device 102 includes the log hints 806 that may be used for quick temporal scans of a portion of the log index 802. Accordingly, the storage system 150 provides a clustered storage system having a two-dimensional global deduplication index that enable scaling of the storage system to more or fewer nodes. In addition, each service computing device 102 may maintain its own persistent index log storage and lookup structure storage to enable the corresponding index shard to be recovered if there is a failure.

Figure 10:
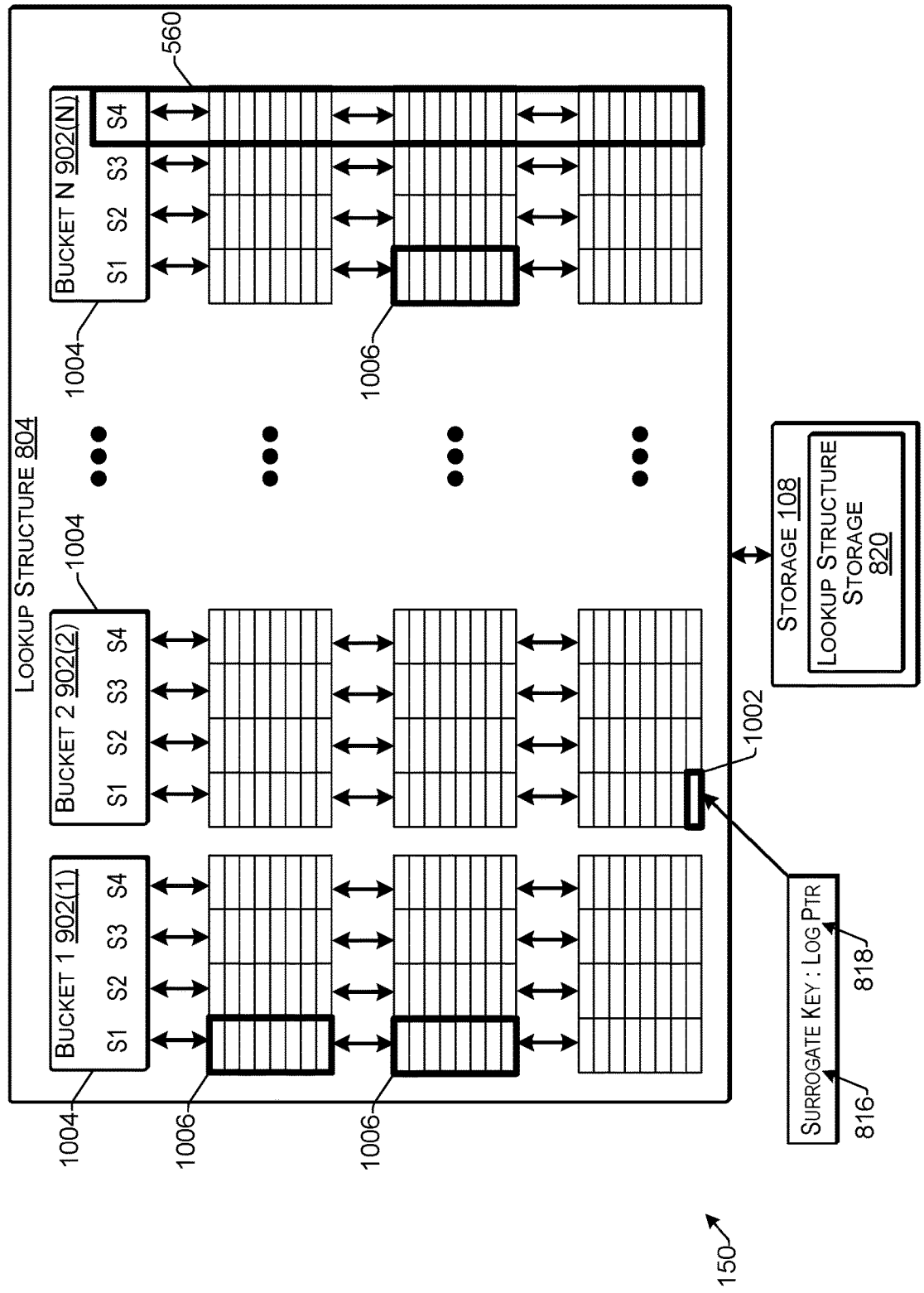
FIG. 10 illustrates an example lookup structure configuration according to some implementations.

FIG. 10 illustrates an example of the lookup structure 804 according to some implementations. In this example, the lookup structure 804 may be configured with the stripes 506 and may be stored in the storage 108 according to the stripes 506. In some examples, the stripes 506 may be configured for in-core hash-based fast lookup structures. Thus, the stripes 506 may also serve as a hash lookup key, effectively sub-dividing hash bucket chains for reducing scan times and improving sequential pre-fetching. Similar to the slices 504, the stripes 506 are on-node only structures, i.e., it is not necessary to provide remote routing for the slices 504 or the stripes 506. Additionally, as discussed above with respect to FIG. 7, similar to the slices 504, the stripes 506 may be organized according to ranges corresponding to a portion of the bytes in the data-portion identifiers. Further, the stripes 506 may be mapped to individual files or logical units, depending on the implementation.

In this example the lookup structure 804 may be for a slice of a shard, as discussed above. For dividing the lookup structure 804 into stripe, the entries 1002 of the lookup structure may be sub-divided into a plurality of buckets 1004, and each bucket 1004 may be divided into a plurality of vertical stripes 506. Further, the lookup structure 804 may enable caching of pages 1006 within the stripes 506. For example, each strip 506 may be divided into a plurality of pages 1006. As one example, a page 1006 may contain M entries 1002, each entry 1002 including a surrogate key 816 and a log pointer 818. As several non-limiting examples, M may equal 512 or 1024 and a page may be 4 kB. Further, each bucket 1004 may be composed of L stripes (L=4 in this example), and each stripe 506 may be a list of M vertical page 1006. Each page 1006 may contain N entries.

Accordingly, in some examples, the lookup structure 804 may include a hash table that is organized by buckets 1004. Each bucket is composed of one or more cache pages 1006 that hold a list of surrogate keys 816. Accordingly, implementations herein may walk to the shard, walk to the slice, walk into the lookup structure 804 (e.g., a hash index), walk to the proper bucket 1004, and then scan all the surrogate keys 816 under that bucket, e.g., by scanning all the pages 1006 full of surrogate keys. These pages 1006 may also be ordered by age and ordinal key value to support efficient searching. Thus, searching for a matching surrogate key in a bucket may include traversing a hash table portion performing a key-based lookup. The temporal index log searches described above (e.g., based on log hints) may be performed first in the hope of avoiding a bucket/page search.

In some examples, the primary on-node index structures (i.e., the index log and the lookup structures) may be all cached in memory, at least in part. As one example, the lookup structures 804 may be fully cached or otherwise maintained in memory, while only a portion of the index log 802 might be in memory at any point in time. For instance the lookup structures 804 may be made compact through the use of surrogate keys, and may have a fixed overhead per key for accurate memory sizing. In addition, the lookup structures 804 may be sparse in that, in some examples, not all index log entries have a corresponding entry in the lookup structure 804.

On the other hand, the index log 802 may not have a fixed footprint and therefore, it may be difficult to fully cache the index log unless the index log 802 is relatively small. In addition, the cache operation for the lookup structure 804 may be quite different from the cache operation for the index log 802. As one example, the cache configuration for the lookup structures 804 into memory may be a node-local copy-back cache organized to write very infrequently. The cache configuration for the index log, on the other hand, may be an aggressive write-thru cache.

Paging features of the cache may allow coherent mediated access to index structures that are far larger than available memory. As discussed above, indexes, and the deduplication index herein in particular may run faster with a large amount of memory. Further, the deduplication index may also run well in memory poor environments and paging is critical in these environments since only the relevant parts of the deduplication index may be in memory when needed.

The underlying structures of the index, and in particular the separation of lookup structures and the index log, and the stripe segmentation thereof are designed to make pageable operation of the index tolerable for very large capacities. In particular, these structures are designed (and page sizes are configurable) to reduce page thrashing, provide clustered read-ahead and to organize page lists so best eviction selections can be made. In some example, the lookup structures are pageable separately from the index log, i.e., both structures may be independently pageable, and may be configured with very different page sizes, cache sizes, and different paging in/out criteria. Accordingly, each local deduplication index portion of the global deduplication index has two parts, namely the lookup structures 804 and the index logs 802. Both are separately pageable and are allocated their own pools of memory and storage. This feature helps to enable support for the log hints discussed above. For instance, since the log hints are pointers into the index log, the algorithms for managing the log hints may take into account index log cache feedback. The log hints may bridge the lookup structure and the index log in that the log hints are sized, allocated, and reused based on index hash sparseness and also based on dynamic log cache feedback. Given that the lookup structure and index log are separately cacheable and pageable, implementations herein are able to lock the lookup structure into memory, and run the index log as a very large pageable structure (or vice-versa in some cases). This enables operation both in systems having large memory configurations and in systems having small memory configurations.

Figure 11:
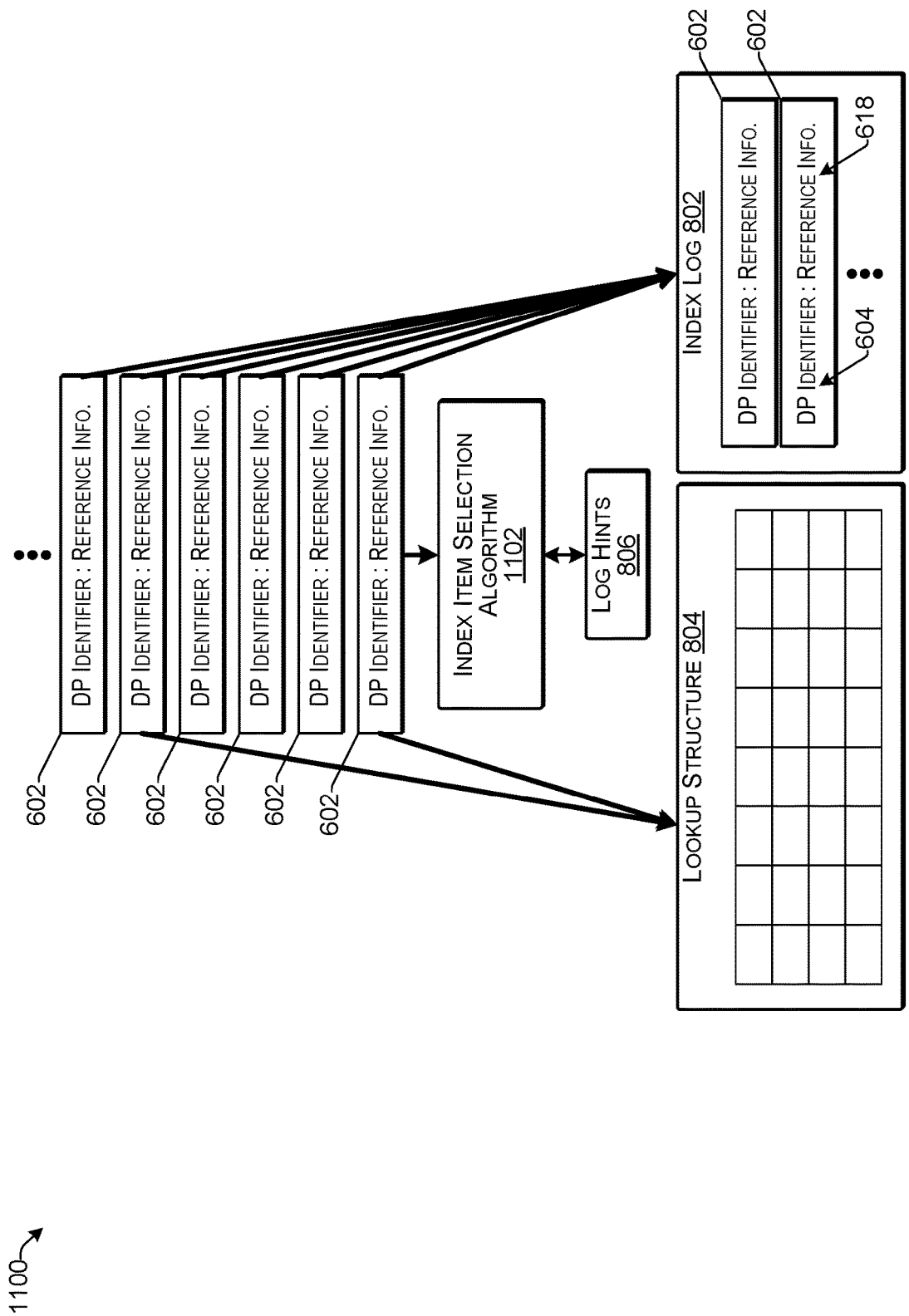
FIG. 11 illustrates an example of index item selection processing in a smart mode according to some implementations.

FIG. 11 illustrates an example 1100 of smart selection of index items to add to the lookup structure 804 according to some implementations. As discussed above, index items added to the index log 802 may continue to exist in the index log 802. In addition, the index items may be appended in ranges for efficiency. Further, the lookup structures 804 may be used to locate items in a potentially huge log quickly when hints and other scan techniques fail. To accomplish this, some implementations may include one or more smart modes in which one or more algorithms are employed for selecting some keys for inclusion in the lookup structure 804 while not selecting others, or in other words, filtering out un-needed keys from being included in the lookup structure 804. The techniques herein may be used to save space in the memory and storage of the service computing devices 102. Further, because the lookup structures 804 are not the only way to find a key in the index log 802, the smart mode algorithms may be configured to store and/or lookup a key only when there are no more efficient ways to find the key. Accordingly, the smart mode algorithms may include one or more probabilistic algorithms to determine which keys may be likely to be found by other techniques, such as through layered temporal scans.

In some cases, one feature of the split local index design (i.e., separate lookup structure 804 and index log 802) is that the surrogate keys may be removed from the lookup structure 804, while the corresponding data-portion identifier may still exist for some time in the index log 802. For instance, these data-portion identifiers may still be found through log hints 806 even though they cannot be found through a search of the lookup structure 804. This means that clipping may be independently specified for the lookup structure 804 and the index log 802, allowing small memory configurations that configured to cache the full lookup structure 804 to be clipped far more aggressively than the index log. Further, in some implementations, surrogate keys may be clipped out of the lookup structure 804, and if hit again as corresponding to duplicate data portions, may be re-added to the index log because they are frequently used. Accordingly, the clipping herein may be dynamically controlled based on duplicate key hit rates.

In the illustrated example, suppose that a smart mode algorithm is executing on at least one of the service computing devices as an index item selection algorithm 1102. Index item selection algorithm 1102 may be executed to monitor each index item 602 received for addition to the index log 802 managed by the service computing device. As one example, the algorithm 1102 may keep count of the index items 602 as they are received for addition to the index log 802. Further, the algorithm 1102 may select certain index items 602 for which to add corresponding information to the lookup structure 804. In this example, the algorithm 1102 is configured to select every fourth received index item 602 for adding an entry to the lookup structure 804. In other examples, other index item selection techniques may be applied. Thus, while every received index item 602 continues to be added to the index log 802, only entries for selected index items 602 are added to the lookup structure 804.

In some examples, the algorithm may be executed by the classifier 304 (not shown in FIG. 11), such as discussed above with respect to FIG. 8. Thus, the classifier 304 on each service computing device may be configured to execute the algorithm 1102, or other smart mode algorithms discussed herein. In some example, the smart mode algorithms may be included with the index API, index library, or through other software control techniques.

When a smart mode algorithm is enabled, the storage system 150 may control the algorithms via configuration information and/or based on dynamic feedback determined e.g., from duplicate key hit rates, or the like. For example, the storage system 150 may control what algorithm is executed and how the algorithm is parameterized. Each index item to be added may then be monitored or otherwise tracked by the executing algorithm and, if selected, may be added to the lookup structures 804. In addition, key selection may be dense or sparse. Dense key selection may mean that all or most keys are selected and meager space savings in the lookup structures 804 is traded-off against better deduplication performance. As the key selection space is made more sparse, the size of the lookup structures 804 may be reduced quickly, but the deduplication performance may be affected. Alternatively, some implementations may start out sparse and add surrogate keys based on duplicate key hit rates (partly through smart rules, and, in some examples, include clipping old keys). Thus, the sparse key selection may be dynamic. Of course, the denser the key selection, the less things change unless clipping is enabled, but sparse key selection may become more dense as duplicates are discovered.

The relation between sparseness and deduplication rate in some examples herein may be characterized as follows. When every key is added to the lookup structures 804, this may be referred to as 1-to-1 mode, based on the relation between the content of the lookup structure 804 and the content of the index log 802. Thus, while some keys may be located more quickly by other means some of the time (e.g., the log hints), if a particular key is not found by the other means, the key will still be able to be found through the lookup structures 804. On the other hand, as the storage of keys in the lookup structures 804 becomes more sparse, some keys may be found through block scan lists or index log scans, but if these techniques fail the lookup structures 804 may be consulted. If there is not an entry in the lookup structure 804, then an example situation may be as follows: the item may be in the index log 802, but cannot be found without extensive searching. In this situation, if the lookup in the lookup structure 804 fails, some implementations herein may mark the index item as not being present in the index log 802, rather than conducting the extensive search of the index log 802. This results in a lost deduplication opportunity, but prevents a considerable performance penalty that might result from searching the index log 802. Additionally, some of the modes may be decided as keys are presented, and other modes may start sparse and re-add keys. Furthermore, when a surrogate key is added to the lookup structure, an indication of this may be marked in index log in association with the corresponding data-portion identifier. This allows the lookup structure 804 to be lost and correctly rebuilt even if the lookup structure has dynamically evolved. Thus, the lookup structure 804 may be completely recoverable including to same condition of sparseness as when it was lost, regardless how the selections for sparseness were made.

Accordingly, the sparser the lookup structures 804 are made, the faster the search times for these structures may become, e.g., because the key structures fit better in memory and may be searched more quickly. The tradeoff is that as the lookup structure 804 becomes sparser, the greater the chance that deduplication opportunities will be missed. Accordingly, the smart mode algorithms enable a tradeoff between performance and deduplication rate, such as depending on environment or implementation. This tradeoff can be precisely controlled by controlling the parameters of the smart mode algorithms, e.g., by controlling the sparseness of index item selection. Further, the actual performance increase for increased sparseness may depend in part on the workload and the configuration of the service computing devices.

Some implementations provide several different smart modes supported by the deduplication index. Examples of smart modes may include the following:

SMART_MODE_DEFAULT—this is the default 1-to-1 behavior, where every data-portion identifier surrogate key goes into the lookup structures 804.

SMART_MODE_SPARSE—in this mode, the algorithm 1102 may select every Nth index item for adding an entry to the lookup structures 804.

SMART_MODE_SMART—this mode uses an algorithm based on the hash of the data-portion identifier to select particular "recognized" keys for adding entries to the lookup structures 804.

Further, while three modes are described above, each of these may be parameterized differently. So, SMART_MODE_SPARSE algorithm may be configured with different Nth item settings to control the sparseness of the lookup structures 804. In some modes, the sparseness may change and may be tuned for different workloads. In general, tuning may not be necessary, but to obtain optimal performance for very large workloads, the modes may be changeable at runtime and may be dynamic. Furthermore, each mode may be a set of rules for index item selection. In some examples, the modes may use key hashes to select keys for insertion. For instance, the modes may vary the sparseness criteria for selecting data-portion identifiers so as to match types of data being ingested. Additionally, the foregoing are only three examples of possible modes. Numerous other possible modes and variations thereof will be apparent to those of skill in the art having the benefit of the disclosure herein.

As one example, if the algorithm 1102 merely selects every 4th index item 602, with no additional intelligence, then there may be a larger number of lookup misses than desired. Accordingly, in some implementations herein the smart mode algorithms may use the log hints 806 (and the implied groups of ordering) to apply a meaningful Nth key strategy. For example, the Nth key may be based on per-hint object ordering constraints. As one example, the duplicate ranges between objects usually occur in ranges, so the algorithms herein may add some range-based information to the selection process. As discussed above, some implementations may maintain, e.g., on a per-file basis, per-logical unit basis, etc., a plurality of log hints 806 (e.g., a hints vector that may include, e.g., 16 entries). As existing keys are matched, pointers to the index log locations may be added to the log hints. The log hints may be maintained in order from most recent match to least recent. As more matches come in, the oldest hints may be replaced. Each hint is a pointer into to the index log, and may further include some information about how wide the range for a search in the index log should be, i.e., how many entries forward and how many entries backward. In some cases, the search range may be a default threshold, but in other cases, the search range may be able to grow and shrink. The searches may be performed forward and backward for two reasons, namely, to increase the chance of hitting a duplicate and to account for moderate out-of-order ingests.

When the classifier performs a temporal scan of the index log based on the hints, the classifier may traverse the hints in order from newest to oldest, and scan the index log at the indicated locations over the indicated ranges. If a hit is found, the corresponding hint may be moved up to the front of the list of log hints. If no match is found, the hints are sequentially moved to the end of the list and subsequently removed as new hints are added to the front of the list. If a hint specifies a log page that is not in memory, the classifier may apply one or more smart mode rules to determine whether to load the log page into memory to scan that page, or to or skip loading the page. The mode rules may also alter the range of the search forward and backward from a specified location in the index log. Some modes may include a fixed range, and other modes may include variable and/or dynamic ranges. The number of hints included in the log hints 806 may be variable, but typically may including more than one hint since, when a file matches data already in the system, it often matches ranges from more than one file. Each range from each file may warrant a separate hint. The more hints, the more memory of past matches.

In addition, the algorithms for selection of index items to include in the lookup structure 804 may apply their logic in order, and the relative object ordering, first key/last key in a range, and probabilistic selections within a duplicate range (i.e., sub-ranges of a large string of duplicate data portions). If an index item is not selected by these first selection criteria, then the final smart mode algorithm may be applied. Accordingly, the smart node algorithms may reduce the number of keys that are included in the lookup structures 804 through the use of probabilistic algorithms. When applied in conjunction with the external scan lists and internal log scan features can be very powerful and quite a boon to performance. In addition, the smart mode algorithms also allow the index to be tailored to different memory/disk configurations while still enabling large amounts of overall storage capacity with reasonable performance. Further, the smart modes enable the deduplication index to be tuned for primary, secondary, or offline (i.e., post-process) use. Smart modes are completely configurable, and the entire multi-layered index structures are key to their support.

The structures used in the lookup structure 804 and index log 802 may be highly optimized for efficient storage and may be configured to be as small as possible. To make these structures small, the lookup structure 804 is separate from the structures of the index log 802. Further, because of the segmentation of these structures according to data-portion identifier ranges, a certain maximum number of entries may be maintained in each index log 802. This enables the pointer 818 (in FIG. 8) to the data-portion identifier in the log index 802 to be the minimal number of bytes. In addition, the lookup structures 804 do not store the entire data-portion identifier. Instead, some implementations determine a surrogate key from the data-portion identifier that is typically less than half the size of the original data-portion identifier. The surrogate key is placed in the lookup structures along with the pointer 818 to the location of the actual data-portion identifier for a very large space savings per item. As mentioned above, the surrogate keys may be significantly shorter than the data-portion identifiers on which they are based, but this also may be result in collisions (occurrences in which a surrogate key matches more than one full data-portion identifier). This occurrence maybe resolved by using the matching surrogate keys to determine locations in the index log to determine if any of the corresponding data-portion identifiers are an exact match. Thus, implementations herein may trade a smaller memory footprint for the possibility of having to conduct multiple log searches. Furthermore, as mentioned above, the index log cache may be configured as a write-thru cache, whereas the lookup structure cached may be configured as a copy-back design. Thus, writes to the index log may be flushed immediately for recovery reasons. Consequently, index log cache may also be used for read back operations, which covers log scans and surrogate key match searches.

The global deduplication index herein is able to support classification of deduplication data portions for incoming data streams. The deduplication index stores nothing necessary to recapitulating a file or object after being stored. In other words, the deduplication index and its structures may be configured to not be needed or otherwise used for read-side access. Although this may result in redundant metadata in some cases, careful pruning of the index structures not only keeps them small and fast, but also works to reduce referential data duplication. Freeing the index from read-side operation improves read-side performance, and may also limit index load to write-side operations and replication, allowing the structures to scale better. Further, in some examples, the global deduplication index may be need only partially on the write-side. For instance, if the classifier is able to locate matches through external temporal lookup (e.g., scan lists or TOC) the global index is not accessed during these operations. Of course, the external temporal lookups may not be sufficient to match all ingested data, so the global deduplication index to find matches in these cases. In addition, when implemented in a deduplication system that does not include an external temporal lookup mechanism (e.g., such as a SAN device), the global deduplication index is the used to classify write-side data. However, temporal-based lookup operations may still be performed via the log and hint structures. Furthermore, in cross-node write-operations the global deduplication index may enable the system to function as a global deduplication repository.

In addition, recovery becomes much easier to implement. In fact, data can be ingested without the index being up and functioning. In this mode of operation, the classifier, knowing that the index is not functioning, may simply treat every deduplication data portion as unique. This allows the files/objects to be ingested and sent back out, albeit with no deduplication space reduction. However, because the smart index may function in post-process or inline modes, the index can be brought up latently, and background processes (e.g., scrubbers) may be able to catch up with deduplication processing transparently.

This recovery model may make clustered operations easier. For example, suppose that the number of defined nodes in a system changes. Each configuration change (if not carefully considered a-priori) might require a rebalancing of shards. This rebalancing might be done in the background while the system continues operations. Alternatively, the deduplication index may be discarded and rebuilt. A similar approach may be taken if a node fails, i.e., operation of the storage system may continue even though the index is unbalanced. Rebalancing may take place in the background or on demand. Further, the lookup structures may be rebuilt to the same level of sparseness as in the original lookup structure when failure occurred.

Finally, the multi-layered design also facilitates fast-lookup verification and recovery. Because the temporal index log is an inherently stable structure (e.g., a write-through committed cache model), it may be relatively easy to rebuild the fast-lookup structures from the index log. Further, the lookup structures, that benefit the most from aggressive caching and memory, do not need to be protected. For example, when the lookup structure 804 is lost, becomes corrupt, or the like, it may be simply dropped and rebuilt.

When smart modes are enabled, the index log may include one additional bit of information to indicate which entries were selected by the smart mode algorithms for inclusion in the lookup structure. Accordingly, the lookup structure may be rebuilt identically even though the original selection criteria may be no longer available.

Figure 12:
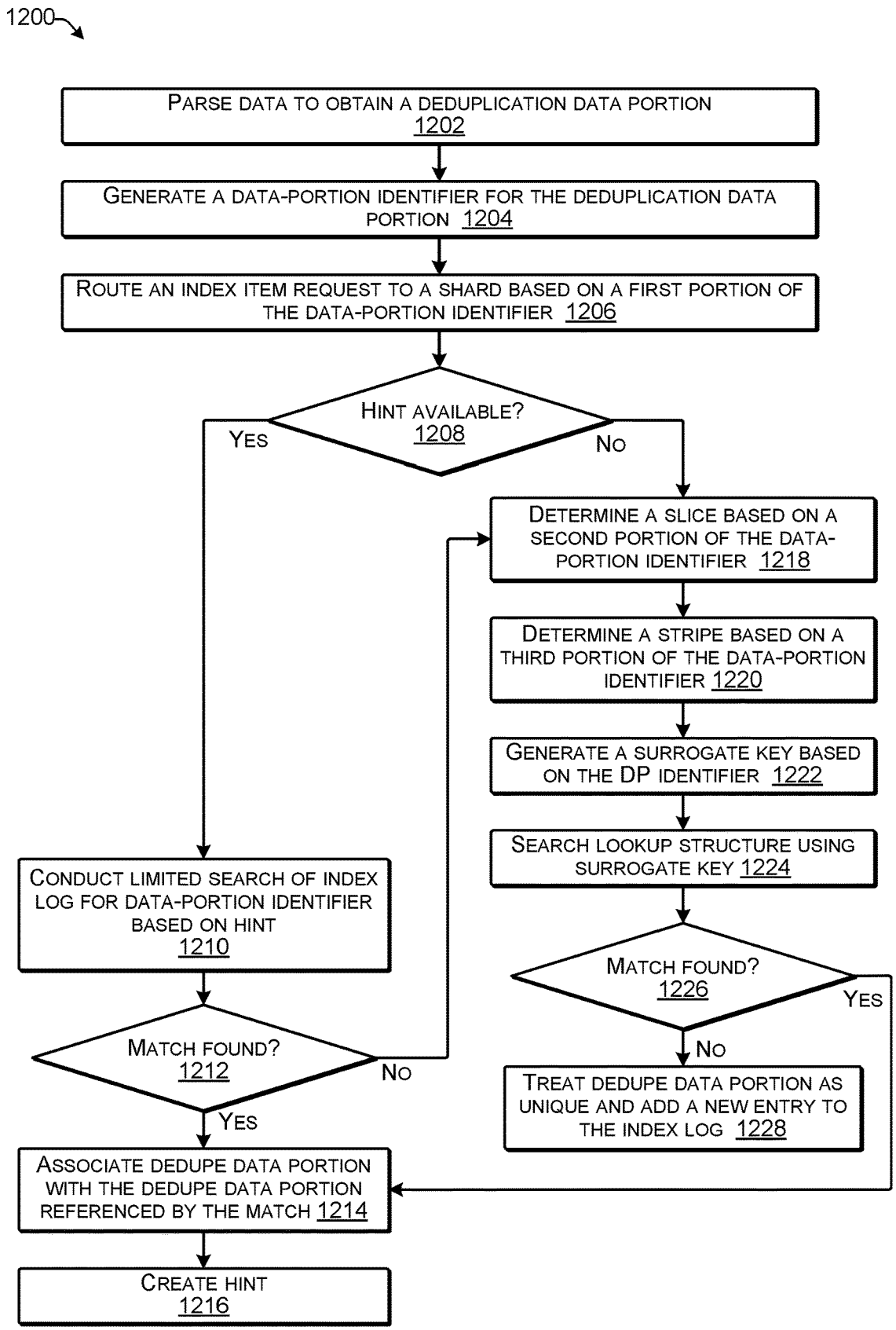
FIG. 12 is a flow diagram illustrating an example process for searching for handling an index item request according to some implementations.
Figure 13:
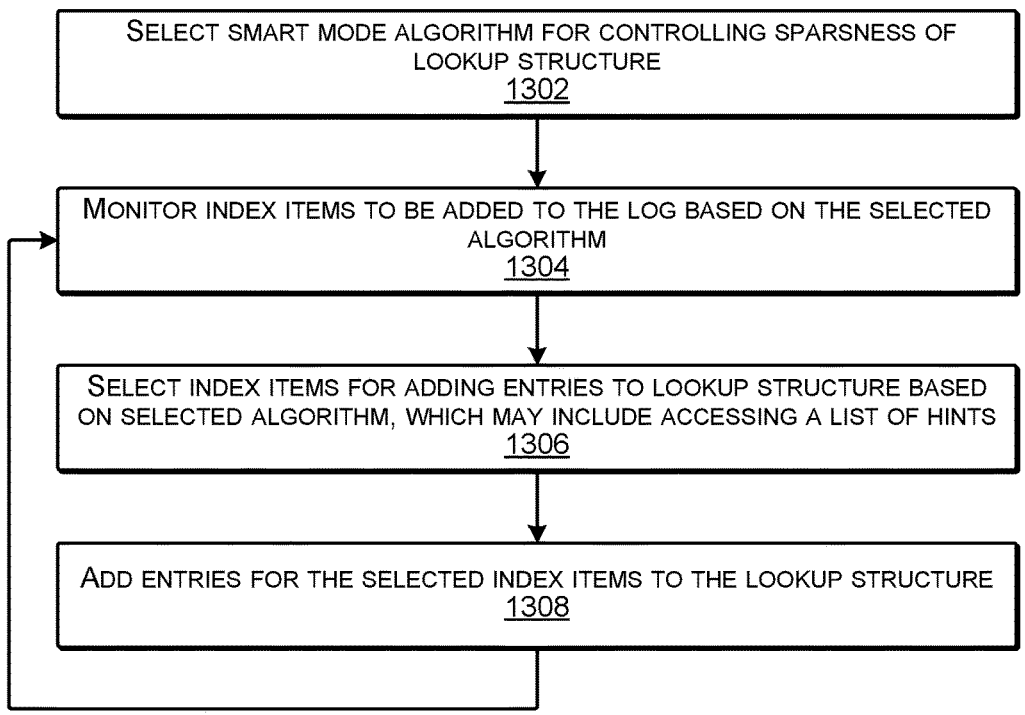
FIG. 13 is a flow diagram illustrating an example process for smart mode operation according to some implementations.

FIGS. 12-13 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 12 is a flow diagram illustrating an example process 1200 for handling an index item request according to some implementations. In some examples, the process 1200 may be executed by one or more of the service computing devices 102 or other suitable computing devices.

At 1202, the computing device may parse data to obtain a deduplication data portion. For example, the parsing may be performed inline or post-process, and may be performed for data deduplication as part of a data ingestion process, as part of a data replication process, as part of a data move, or the like.

At 1204, the computing device may generate a data-portion identifier for the deduplication data portion. As discussed above, any of numerous techniques may be used to generate a data-portion identifier that at least partially represents the content of the subject deduplication data portion.

At 1206, the computing device may route an index item request to a shard based on a first data-portion identifier portion of the data-portion identifier. For example, the routing may be based on range of the first data-portion identifier portion assigned to each shard. If the shard is local, the index item request is routed locally on the service computing device. If the shard is on a different service computing device, the index item request may be sent using an RPC, or the like.

At 1208, the computing device may determine whether a hint is available. For example, the hints may include locations in the index log that were recent matches, i.e., proximate in time, such as having occurred within a threshold period of time with respect to a current time. Further, these portions of the index log may still be in memory and may be quickly searchable.

At 1210, the computing device may conduct a limited search of the index log for a match for the data-portion identifier based on the hint. For example, the hint may indicate the location of an index match for an index item received proximate in time (e.g., within a threshold period) of the item being considered. Thus, the index log may be searched ahead and/or behind a threshold number of entries (e.g., 10, 32, 64, 100 entries in either direction) to attempt to locate a match for the currently considered data-portion identifier.

At 1212, the computing device may determine whether a match is found.

At 1214, if a match is found, the computing device may associate reference information for the deduplication data portion of the current data-portion identifier with a second deduplication data portion referenced by reference information associated with the matching data-portion identifier found in the index log.

At 1216, the computing device may create hint. For example, the computing device may add to a hint list the index log location of the matching data-portion identifier to enable use of the hint for searching the index log directly for other index items received subsequently within a threshold time.

At 1218, on the other hand, if a hint is not available at 1208, the computing device may determine a slice based on a second data-portion identifier portion of the first data-portion identifier, such as based on a range of the second portion assigned to each slice of the shard.

At 1220, the computing device may determine a stripe of the slice based on a third data-portion identifier portion of the first data-portion identifier, such as based on a range of the third portion assigned to each stripe.

At 1222, the computing device may generate a surrogate data-portion identifier-based key. For example, the surrogate key may be generated from information in the data-portion identifier so that the surrogate key has a byte size that is less than half of a byte size of the data-portion identifier.

At 1224, the computing device may use the surrogate key to search the lookup structure.

At 1226, the computing device may determine whether a match is found? If a match is found, the process goes to 1214.

At 1228, if a match is not found, the computing device may treat the deduplication data portion as unique and add new entries to index log and the lookup structure. In some examples, if operating in a smart mode, an algorithm may be applied to determine whether to add the entry to the lookup structure.

FIG. 13 is a flow diagram illustrating an example process 1300 for smart mode operation according to some implementations. In some examples, the process 1300 may be executed by one or more of the service computing devices 102 or other suitable computing devices.

At 1302, the computing device may select a smart mode algorithm for controlling sparseness of lookup structure. In some examples, an administrator may indicate the smart mode algorithm to be selected.

At 1304, the computing device may monitor received index items based on the selected algorithm. For instance, the computing device may keep track of index items added to the index log.

At 1306, the computing device may select particular index items of the index items added to the log for adding entries to the lookup structure based on selected algorithm. In some examples, the algorithm may include consulting the hint list or other information for selecting the particular index items.

At 1308, the computing device may add the selected index items to the lookup structure.

Accordingly, implementations herein may include a system that includes one or more processors, and one or more non-transitory computer-readable media maintaining executable instructions, which, when executed by the one or more processors, program the one or more processors to perform operations that include receiving a first data-portion identifier corresponding to a first deduplication data portion, generating a first surrogate key based on the first data-portion identifier, searching a lookup structure to locate a second surrogate key that matches the first surrogate key, accessing an index based on location information associated with the second surrogate key to locate a second data-portion identifier that matches the first data-portion identifier, and associating first reference information for the first deduplication data portion with a second deduplication data portion referenced by reference information associated with the second data-portion identifier.

The system may further perform operations that include generating the surrogate key from information in the first data-portion identifier so that the surrogate key has a byte size that is less than half of a byte size of the first data-portion identifier.

The system may further perform operations that include storing, in the index log, a plurality of data-portion identifiers and associated reference information for a plurality of deduplication data portions deemed to be unique in the system, wherein the index log is configured for storing the plurality of data-portion identifiers in a temporal order based at least partially on when the respective data-portion identifiers are received.

In some examples of the system, the index log is included in a first index shard managed by a first computing device including the one or more processors, one or more other index shards are managed respectively by one or more other computing devices, and the first computing device and the one or more other computing devices are configured as a cluster so that together the first index shard and the one or more other index shards comprise a global deduplication index for the cluster.

The system may further perform operations that include receiving the first data-portion identifier in a communication from one of the other computing devices in the cluster, wherein the first data-portion identifier is received based on a first data-portion identifier portion of the first data-portion identifier being in a range of values assigned to the first index shard, wherein other ranges of values for the first data-portion identifier portion are assigned to the one or more other shards.

The system may further include application programming interface (API) information maintained at the computing devices in the cluster, wherein the API information indicates the ranges of values for the first data-portion identifier portion assigned to the shards. The system may further perform operations that include reconfiguring the ranges of values of the first data-portion identifier portion assigned to the shards, at least in part, by reconfiguring the API information.

In some examples of the system, the first shard is divided into a plurality of slices based at least partially on ranges of values of a second data-portion identifier portion so that each slice corresponds to a different range of values of the ranges of values of the second data-portion identifier portion. The system may further perform operations that include determining a first slice, of the plurality of slices, corresponding to the first data-portion identifier based at least partially on the second data-portion identifier portion of the first data-portion identifier having a value falling within the range of values corresponding to the first slice.

In some examples of the system, individual slices of the plurality of slices are divided into a plurality of stripes based at least partially on ranges of values of a third data-portion identifier portion so that each slice corresponds to a different range of values of the ranges of values of the third data-portion identifier portion. The system may further perform operations that include determining a first stripe, of the plurality of stripes, corresponding to the first data-portion identifier based at least partially on the third data-portion identifier portion of the first data-portion identifier having a value falling within the range of values corresponding to the first stripe, wherein each stripe of the plurality of stripes corresponds to a different location in storage.

The system may further perform operations that include adding, to a hint list, location information regarding the location of the second data-portion identifier, receiving a third data-portion identifier at a time proximate to receipt of the first data-portion identifier, and searching the index log a threshold number of entries ahead and/or behind the location of the second data-portion identifier in the index log to attempt to locate a match for the third data-portion identifier.

The system may further perform operations that include, based at least partially on failing to find the match for the third data-portion identifier, generating a third surrogate key based on the third data-portion identifier, and searching the lookup structure to attempt to locate a surrogate key that matches the third surrogate key.

The system may further perform operations that include monitoring a plurality of index item requests received during deduplication processing, each index item request including a data-portion identifier, and selecting particular index items for adding entries to the lookup structure based at least partially on an algorithm for controlling sparseness of the entries in the lookup structure.

The system may further perform operations that include accessing a list of hints for determining, at least partially, the particular index items to select, wherein a hint in the list of hints includes information about an entry in the index log matched within a threshold period of time.

In addition, a method herein may include receiving, by one or more processors, a first data-portion identifier corresponding to a first deduplication data portion; generating, by the one or more processors, a first surrogate key based on the first data-portion identifier; searching, by the one or more processors, a lookup structure to locate a second surrogate key that matches the first surrogate key; accessing, by the one or more processors, an index log based on location information associated with the second surrogate key to locate a second data-portion identifier that matches the first data-portion identifier; and associating, by the one or more processors, first reference information for the first deduplication data portion with a second deduplication data portion referenced by reference information associated with the second data-portion identifier.

In some example, the method may further include storing, in the index log, a plurality of data-portion identifiers and associated reference information for a plurality of deduplication data portions deemed to be unique in the system, wherein the index log is configured for storing the plurality of data-portion identifiers in a temporal order based at least partially on when the respective data-portion identifiers are received; and generating the surrogate key from information in the first data-portion identifier so that the surrogate key has a byte size that is less than half of a byte size of the first data-portion identifier.

In addition, some examples may include one or more non-transitory computer-readable media storing instructions that, when executed by one or more processors, program the one or more processors to: receive a first data-portion identifier corresponding to a first deduplication data portion, generating a first surrogate key based on the first data-portion identifier, search a lookup structure to locate a second surrogate key that matches the first surrogate key, access an index based on location information associated with the second surrogate key to locate a second data-portion identifier that matches the first data-portion identifier, and associate first reference information for the first deduplication data portion with a second deduplication data portion referenced by reference information associated with the second data-portion identifier.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media. Thus, the index arrangement herein may be implemented on physical hardware, may be used in virtual implementations, may be used as part of overall deduplication system on either physical or virtual machine, and/or may be as a component for other deduplication implementations (e.g., SAN) or in some non-deduplication environments, such as large scale memory indexing.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first computing device able to communicate with a second computing device, wherein the first computing device includes a first index portion of a deduplication index and the second computing device includes a second index portion of the deduplication index, wherein the first computing device includes one or more processors configured to perform operations comprising:

receiving, by the first computing device, from the second computing device, a first data-portion identifier corresponding to a first deduplication data portion, wherein the first data-portion identifier is received based on a first data-portion identifier portion of the first data-portion identifier being in a range of values assigned to the first index portion;

locating, in the first index portion of the deduplication index, a second data-portion identifier that matches the first data-portion identifier; and associating first reference information for the first deduplication data portion with a second deduplication data portion referenced by reference information associated with the second data-portion identifier, wherein the first computing device and the second computing device are configured as a cluster so that together the first index portion and the second index portion comprise a global deduplication index for the cluster, wherein the first index portion includes a first index log including a plurality of data-portion identifiers and associated reference information for a plurality of deduplication data portions deemed to be unique in the system, and wherein the index log is configured for storing the plurality of data-portion identifiers in a temporal order based at least partially on when the respective data-portion identifiers are received.

2. The system as recited in claim 1, the operations further comprising:

generating a first surrogate key based on the first data-portion identifier;

searching a lookup structure to locate a second surrogate key that matches the first surrogate key; and accessing an index log based on location information associated with the second surrogate key to locate the second data-portion identifier that matches the first data-portion identifier.

3. The system as recited in claim 2, the operations further comprising:

generating the first surrogate key from information in the first data-portion identifier so that the first surrogate key has a byte size that is smaller than a byte size of the first data-portion identifier.

4. The system as recited in claim 2, the operations further comprising:

storing, in the index log, a plurality of data-portion identifiers and associated reference information for a plurality of deduplication data portions deemed to be unique in the system, wherein the index log is configured for storing the plurality of data-portion identifiers in an order based on at least one of:

a temporal order based at least partially on when the respective data-portion identifiers are received;

an order based on location of the corresponding data in a storage; or an order of corresponding files stored in the storage.

5. The system as recited in claim 1, further comprising:

application programming interface (API) information maintained at the first computing device and the second computing device, wherein the API information indicates ranges of values of the first data-portion identifier portion assigned to the first index portion and the second index portion; and the operations further comprising reconfiguring the ranges of values of the first data-portion identifier portion assigned to the first index portion and the second index portion, at least in part, by reconfiguring the API information.

6. The system as recited in claim 1, wherein the first index portion is divided into a plurality of slices based at least partially on ranges of values of a second data-portion identifier portion so that each slice corresponds to a different range of values of the ranges of values of the second data-portion identifier portion, the operations further comprising:

determining a first slice, of the plurality of slices, corresponding to the first data-portion identifier based at least partially on the second data-portion identifier portion of the first data-portion identifier having a value falling within the range of values corresponding to the first slice.

7. The system as recited in claim 6, wherein individual slices of the plurality of slices are divided into a plurality of stripes based at least partially on ranges of values of a third data-portion identifier portion so that each stripe corresponds to a different range of values of the ranges of values of the third data-portion identifier portion, the operations further comprising:

determining a first stripe, of the plurality of stripes, corresponding to the first data-portion identifier based at least partially on the third data-portion identifier portion of the first data-portion identifier having a value falling within the range of values corresponding to the first stripe, wherein each stripe of the plurality of stripes corresponds to a different location in storage.

8. The system as recited in claim 1, wherein the first index portion includes a first index log including a plurality of data-portion identifiers and associated reference information for a plurality of deduplication data portions deemed to be unique in the system, wherein the index log is configured for storing the plurality of data-portion identifiers in a temporal order based at least partially on when the respective data-portion identifiers are received, the operations further comprising:

adding, to a hint list, location information regarding the location of the second data-portion identifier;

receiving a third data-portion identifier at a time proximate to receipt of the first data-portion identifier; and searching the index log a threshold number of entries ahead and/or behind the location of the second data-portion identifier in the index log to attempt to locate a match for the third data-portion identifier.

9. The system as recited in claim 8, the operations further comprising:

based at least partially on failing to find the match for the third data-portion identifier, generating a surrogate key based on the third data-portion identifier; and searching a lookup structure to attempt to locate another surrogate key that matches the generated surrogate key, the lookup structure including a plurality of surrogate keys corresponding to at least some of the data-portion identifiers in the first index log.

10. The system as recited in claim 9, the operations further comprising monitoring a plurality of index item requests received during deduplication processing, each index item request including a data-portion identifier; and selecting particular index items for adding entries to the lookup structure based at least partially on an algorithm for controlling sparseness of the entries in the lookup structure.

11. The system as recited in claim 10, the operations further comprising:

accessing the hint list for determining, at least partially, the particular index items to select, wherein a hint in the hint list includes information about an entry in the index log matched within a threshold period of time.

12. The system as recited in claim 9, the operations further comprising:

for each particular item selected to be added as an entry to the lookup structure, associating with respective corresponding data-portion identifiers in the index log an indication of selection to be added to the lookup structure; and reconstructing the lookup structure using the indication associated with the respective corresponding data-portion identifiers in the index log.

13. A method comprising:

receiving, by a first computing device, from a second computing device, a first data-portion identifier corresponding to a first deduplication data portion, wherein the first computing device includes a first index portion of a deduplication index and the second computing device includes a second index portion of the deduplication index, and wherein the first data-portion identifier is received based on a first data-portion identifier portion of the first data-portion identifier being in a range of values assigned to the first index portion;

generating a first surrogate key based on the first data-portion identifier;

searching a lookup structure to locate a second surrogate key that matches the first surrogate key;

locating, in the first index portion of the deduplication index, a second data-portion identifier that matches the first data-portion identifier by accessing an index log based on location information associated with the second surrogate key to locate the second data-portion identifier that matches the first data-portion identifier; and associating first reference information for the first deduplication data portion with a second deduplication data portion referenced by reference information associated with the second data-portion identifier.

14. The method as recited in claim 13, wherein:

the first computing device and the second computing device are configured as a cluster so that together the first index portion and the second index portion comprise a global deduplication index for the cluster; and the first index portion includes a first index log including a plurality of data-portion identifiers and associated reference information for a plurality of deduplication data portions deemed to be unique in the system, wherein the index log is configured for storing the plurality of data-portion identifiers in a temporal order based at least partially on when the respective data-portion identifiers are received.

15. The method as recited in claim 13, wherein the first index portion includes a first index log including a plurality of data-portion identifiers and associated reference information for a plurality of deduplication data portions deemed to be unique in the system, wherein the index log is configured for storing the plurality of data-portion identifiers in a temporal order based at least partially on when the respective data-portion identifiers are received, the method further comprising:

adding, to a hint list, location information regarding the location of the second data-portion identifier;

receiving a third data-portion identifier at a time proximate to receipt of the first data-portion identifier; and searching the index log a threshold number of entries ahead and/or behind the location of the second data-portion identifier in the index log to attempt to locate a match for the third data-portion identifier.

16. The method as recited in claim 13, wherein application programming interface (API) information is maintained at the first computing device and the second computing device, wherein the API information indicates ranges of values of the first data-portion identifier portion assigned to the first index portion and the second index portion, the method further comprising:

reconfiguring the ranges of values of the first data-portion identifier portion assigned to the first index portion and the second index portion, at least in part, by reconfiguring the API information.

17. One or more non-transitory computer-readable media storing instructions that, when executed by one or more processors of a first computing device, program the one or more processors to:

receive, by the first computing device, from a second computing device, a first data-portion identifier corresponding to a first deduplication data portion, wherein the first computing device includes a first index portion of a deduplication index and the second computing device includes a second index portion of the deduplication index, wherein the first data-portion identifier is received based on a first data-portion identifier portion of the first data-portion identifier being in a range of values assigned to the first index portion;

locate, in the first index portion of the deduplication index, a second data-portion identifier that matches the first data-portion identifier;

associate first reference information for the first deduplication data portion with a second deduplication data portion referenced by reference information associated with the second data-portion identifier, wherein the first index portion is divided into a plurality of slices based at least partially on ranges of values of a second data-portion identifier portion so that each slice corresponds to a different range of values of the ranges of values of the second data-portion identifier portion; and determine a first slice, of the plurality of slices, corresponding to the first data-portion identifier based at least partially on the second data-portion identifier portion of the first data-portion identifier having a value falling within the range of values corresponding to the first slice.

18. The one or more non-transitory computer-readable media as recited in claim 17, wherein individual slices of the plurality of slices are divided into a plurality of stripes based at least partially on ranges of values of a third data-portion identifier portion so that each stripe corresponds to a different range of values of the ranges of values of the third data-portion identifier portion, wherein the one or more processors are further programmed to:

determine a first stripe, of the plurality of stripes, corresponding to the first data-portion identifier based at least partially on the third data-portion identifier portion of the first data-portion identifier having a value falling within the range of values corresponding to the first stripe, wherein each stripe of the plurality of stripes corresponds to a different location in storage.

19. The one or more non-transitory computer-readable media as recited in claim 17, wherein the one or more processors are further programmed to:

generate a first surrogate key based on the first data-portion identifier;

search a lookup structure to locate a second surrogate key that matches the first surrogate key; and access an index log based on location information associated with the second surrogate key to locate the second data-portion identifier that matches the first data-portion identifier.

20. The one or more non-transitory computer-readable media as recited in claim 17, wherein application programming interface (API) information is maintained at the first computing device and the second computing device, wherein the API information indicates ranges of values of the first data-portion identifier portion assigned to the first index portion and the second index portion, wherein the one or more processors are further programmed to:

reconfigure the ranges of values of the first data-portion identifier portion assigned to the first index portion and the second index portion, at least in part, by reconfiguring the API information.

* * * * *